(12) United States Patent
Mikame

(10) Patent No.: US 6,405,697 B2
(45) Date of Patent: Jun. 18, 2002

(54) VALVE CHARACTERISTIC CONTROL APPARATUS OF INTERNAL COMBUSTION ENGINE AND METHODS OF CONTROLLING VALVE CHARACTERISTICS

(75) Inventor: Kazuhisa Mikame, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/791,585

(22) Filed: Feb. 26, 2001

(30) Foreign Application Priority Data

Mar. 9, 2000 (JP) .......................... 2000-065449

(51) Int. Cl.[7] ................................. F01L 1/34
(52) U.S. Cl. ................. 123/90.18; 123/90.15; 123/90.17
(58) Field of Search .................. 123/90.15, 90.18, 123/90.32, 90.17

(56) References Cited

U.S. PATENT DOCUMENTS 6,318,313 B1 * 10/2001 Moriya et al. ........... 123/90.15

FOREIGN PATENT DOCUMENTS

| JP | A 8-177434 | 7/1996 |
|---|---|---|
| JP | 08232617 A | 9/1996 |
| JP | A 11-44226 | 2/1999 |

* cited by examiner

Primary Examiner—Thomas Denion
Assistant Examiner—Sean D. O'Brien
(74) Attorney, Agent, or Firm—Oliff & Berridge, PLC

(57) ABSTRACT

A camshaft provided with three-dimensional cams is connected at its one end to a valve lift-varying actuator. By the valve lift-varying actuator or displacing the camshaft in the directions of an axis of the camshaft, the lift characteristic of intake valves set by the three-dimensional cams is variably controlled to a target amount of valve lift. The valve lift characteristic related to this control is detected as a detected amount of valve lift by a reference-purposed detected portion and a cam angle sensor. An apparatus and a method diagnoses abnormalities in the valve lift-varying actuator by, for example, evaluating whether the amount of change in the detected amount of valve lift is at most a predetermined value and the absolute value of a difference between the detected amount of valve lift and the target amount of valve lift is greater than a predetermined value.

20 Claims, 12 Drawing Sheets

VALVE CHARACTERISTIC CONTROL APPARATUS OF INTERNAL COMBUSTION ENGINE AND METHODS OF CONTROLLING VALVE CHARACTERISTICS

INCORPORATION BY REFERENCE

The disclosure of Japanese Patent Application No. 2000-065449 filed on Mar. 9, 2000 including the specification, drawings and abstract is incorporated herein by reference in its entirety.

BACKGROUND OF THE INVENTION

1. Field of Invention

The invention relates to methods and a valve characteristic control apparatus of an internal combustion engine for variably controlling the valve characteristic of an engine valve in accordance with the operation state of the engine.

2. Description of the Related Art

As a valve characteristic control apparatus, an apparatus described in Japanese Patent Application Laid-Open No. 8-177434, as for example, is known. This apparatus includes a valve lift-varying mechanism that allows variation of the amount of valve lift of an engine valve, and a valve timing-varying mechanism that allows variation of the valve timing. If either one of the varying mechanisms has a fault, the following control is performed. That is, with regard to the valve lift-varying mechanism, the mechanism is switched to a low speed type cam. With regard to the valve timing-varying mechanism, a control is performed such that the relative rotation phase of a camshaft is shifted to retarded side. For this control, the presence or absence of a fault of the valve lift-varying mechanism is diagnosed by detecting the hydraulic pressure of hydraulic oil needed for the switching of a cam (low speed type cam, and a high speed type cam) of the mechanism. The presence or absence of a fault of the valve timing-varying mechanism is diagnosed by detecting the rotation phase of a cam (camshaft).

However, as a valve lift-varying mechanism as described above, a mechanism has recently been proposed in which the camshaft is displaceable in the directions of an axis of the camshaft, and in which the camshaft is provided with a generally termed three-dimensional cam, that is, a cam whose cam lobe is continuously varied from one end to the other end thereof in the directions of the axis. According to such a three-dimensional cam type valve lift-varying mechanism, it becomes possible to continuously change the amount of lift of the valve in accordance with the operation state of the engine.

However, in such a three-dimensional cam type valve lift-varying mechanism, the variable control itself is not binary, and is performed with continuous values. Therefore, for the diagnosis regarding the presence/absence of a failure of the mechanism, the diagnostic technique employed by the aforementioned apparatus cannot be simply applied.

Furthermore, technologies have recently been proposed which more suitably maintain the engine characteristic of the internal combustion engine by constructing a valve characteristic control apparatus through a combination of three-dimensional cam type valve lift-varying mechanism and a valve timing-varying mechanism as described above. In the valve characteristic control apparatuses constructed by combining a valve lift-varying mechanism and a valve timing-varying mechanism, the following problems are unignorable with regard to the fault diagnosis.

That is, for example, in a valve characteristic control apparatus employing a cam angle sensor, the fault diagnosis regarding the valve timing-varying mechanism becomes difficult in a relatively early period as the camshaft is displaced by the valve lift-varying mechanism. Furthermore, since both mechanisms use continuous values for their respective variable controls, it is not easy to identify which one of the mechanisms has an abnormality if any abnormality occurs.

SUMMARY OF THE INVENTION

Accordingly, it is an object of the invention to provide methods and a valve characteristic control apparatus of an internal combustion engine that are capable of precisely diagnosing whether there is an abnormality even with regard to a three-dimensional cam type valve lift-varying mechanism.

In accordance with a first aspect of the invention, a valve characteristic control apparatus of an internal combustion engine includes a camshaft provided with a three-dimensional cam having a cam profile that continuously changes in a direction of an axis of the cam, a valve lift-varying mechanism that allows an amount of valve lift of an engine valve to be varied in accordance with a displaced position of the camshaft in the direction of the axis of the cam, a sensor for detecting valve lift and a controller that receives a signal from the sensor and diagnoses that there is an abnormality of the valve lift-varying mechanism, provided that a deviation between an actually detected amount of valve lift and a target amount of valve lift of the engine valve is greater than a predetermined value and that an amount of change in the actually detected amount of valve lift is less than a predetermined value.

According to the above-described valve lift-varying mechanism, the valve characteristic of the engine valve can be suitably variably controlled by continuously displacing the camshaft provided with the three-dimensional cam in the direction of the axis thereof. However, with regard to the continuous displacement control of the camshaft in the direction of the axis, the target amount of valve lift and the actually detected amount of valve lift are not always equal, due to a response delay in the control.

In this respect, according to the above-described construction, it becomes possible to precisely diagnose that there is an abnormality, that is, an operation abnormality of the valve lift-varying mechanism, based on a determination that the amount of change in the actually detected amount of valve lift is less than the predetermined value even though there is a great deviation between the target amount of valve lift and the actually detected amount of valve lift. In other words, the abnormality is based on a determination that the valve lift characteristic is not in the course of changing.

In accordance with a second aspect of the invention, a valve characteristic control apparatus of an internal combustion engine includes a camshaft provided with a three-dimensional cam having a cam profile that continuously changes in a direction of an axis of the cam, a valve lift-varying mechanism that allows an amount of valve lift of an engine valve to be varied in accordance with a displaced position of the camshaft in the direction of the axis of the cam, at least one sensor that detects actual valve lift and a controller that receives a signal from the at least one sensor and diagnoses that there is an abnormality of the valve lift-varying mechanism, provided that an amount of change in actually detected amount of valve lift of the engine valve is greater than a predetermined value although a state where an instruction to retain the amount of valve lift is outputted has continued for a predetermined duration.

During the state where the instruction is outputted to retain the valve characteristic for a predetermined duration, the amount of change in the actually detected amount of valve lift is considered to become "0" if the valve lift-varying mechanism is normally operating. In this respect, according to the above-described construction, it becomes possible to precisely determine that there is an abnormality, that is, a retainment control abnormality, provided that the amount of change in the amount of valve lift actually detected during that state is greater than the predetermined value.

In accordance with a third aspect of the invention, a valve characteristic control apparatus of an internal combustion engine includes a camshaft provided with a three-dimensional cam having a cam profile that continuously changes in a direction of an axis of the cam, a valve lift-varying mechanism that allows an amount of valve lift of an engine valve to be varied in accordance with a displaced position of the camshaft in the direction of the axis of the cam, a sensor that detects an actual amount of valve lift and a controller that receives a signal from the sensor and diagnoses that there is an abnormality of the valve lift-varying mechanism, provided that a deviation between an actually detected amount of valve lift and a target amount of valve lift of the engine valve is greater than a predetermined value and that there is no abnormality in a retainment control system while in a state where an instruction to retain the amount of valve lift is outputted is present.

When the retainment instruction has been outputted and the retainment control system has no abnormality, the actually detected amount of valve is considered to have converged to the target amount of valve lift. In this respect, it is possible to precisely determine that there is an abnormality, that is, an operation abnormality of the valve lift-varying mechanism, provided that the deviation between the target amount of valve lift and the actually detected amount of valve lift is greater than the predetermined value although the retainment instruction has been outputted and the retainment control system has no abnormality.

In accordance with a fourth aspect of the invention a valve characteristic control apparatus of an internal combustion engine includes a camshaft provided with a three-dimensional cam having a cam profile that continuously changes in a direction of an axis of the cam, a valve lift-varying mechanism that allows an amount of valve lift of an engine valve to be varied in accordance with a displaced position of the camshaft in the direction of the axis of the cam, a sensor that detects actual valve lift and a controller that receives a signal from the sensor and diagnoses that there is an abnormality of the lift-varying mechanism, provided that a deviation between an actually detected amount of valve lift and a target amount of valve lift of the engine valve is greater than a predetermined value and that any one of conditions listed below is met: (a) an amount of change in the actually detected amount of valve lift is less than a predetermined value; (b) a state where an instruction to maintain the amount of valve lift is outputted continues for a predetermined duration; and (c) there is no abnormality in a retainment control system while the state here an instruction to maintain the amount of valve lift is outputted is present.

In this construction, it is possible to precisely diagnose whether the valve lift-varying mechanism has any one of various abnormalities, similarly to the diagnostic means in the first to third aspects. Furthermore, this construction greatly reduces the possibility of a failure in diagnosis regarding the various abnormalities.

In accordance with a fifth aspect of the invention, valve characteristic control apparatus of an internal combustion engine includes a camshaft provided with a three-dimensional cam having a cam profile that continuously changes in a direction of an axis of the cam, a valve lift-varying mechanism that allows an amount of valve lift of an engine valve to be varied in accordance with a displaced position of the camshaft in the direction of the axis of the cam, a valve timing-varying mechanism that allow a valve timing of the engine valve to be varied based on a change in a relative rotation phase between the camshaft and an engine output shaft, a first sensor that detects an actual amount of valve lift, a set of rotation sensors that detect an actual relative rotation phase between the camshaft and the engine output shaft, a controller that receives signals from the first sensor and the set of rotation sensors and diagnoses whether there is an abnormality based on an actually detected amount of valve lift and a target amount of valve lift of the engine valve, and an actually detected relative rotation phase and a target relative rotation phase between the camshaft and the engine output shaft, and the controller forces one of the valve lift-varying mechanism to a minimum engine valve lift side and the valve timing-varying mechanism to a most retarded valve timing side, if the controller determines that there is an abnormality and wherein after the controller forces one of the valve lift-varying mechanism and the valve timing-varying mechanism the controller diagnoses whether the abnormality still exists and if so, the controller distinguishes which one of the valve lift-varying mechanism and the valve timing-varying mechanism has the abnormality.

According to the above-described construction, even if the valve characteristic control apparatus is formed by a combination of the valve lift-varying mechanism and the valve timing-varying mechanism, that is, even if it is difficult to identify which one of the two mechanisms has a valve characteristic abnormality, the valve characteristic control apparatus is able to precisely identify which one of the valve lift-varying mechanism and the valve timing-varying mechanism has an abnormality in the valve characteristic in accordance with the content of the abnormality determined after one of the two mechanisms is forcibly driven in the above-described manner.

In the first to fifth aspects, the valve characteristic control apparatus may further include a controller that performs a foreign object removing process with respect to the valve lift-varying mechanism, if it is determined that the valve lift-varying mechanism has an abnormality.

One of the abnormalities related to the valve lift-varying mechanism is an operation failure caused by a metal chip or the like trapped in the mechanism, for example, in a hydraulic oil supply system, that is, a drive system. When such an abnormality occurs, the metal chip or the like can often be automatically removed by forcibly driving the mechanism.

In this respect, according to the above-described construction, after it is diagnosed that there is an abnormality, the recovery of the valve lift-varying mechanism to a normal state can be attempted by forcibly driving the mechanism.

Furthermore, in the aforementioned aspects, the controller may cause the execution of a fail-safe operation if the mechanism diagnosed as having an abnormality by the controller is the valve lift-varying mechanism. Furthermore, the fail-safe operation is at least one of increasing a fuel supplied to the engine, prohibiting a learning regarding an idle revolution speed control, prohibiting a learning regarding an air-fuel ratio feedback control, expanding a fuel-cut operation region, and upwardly shifting a fuel-cut return revolution speed.

In the above-described constructions, by performing the fail-safe operation after the it controller diagnoses that the valve lift-varying mechanism has an abnormality, a safety-mode operation of the engine can be realized.

It is also an object of this invention to provide methods of diagnosing abnormalities of a valve lift-varying mechanism.

It is also an object of this invention to provide methods of diagnosing a valve retainment control abnormality of a valve lift-varying mechanism.

It is also an object of this invention to provide methods of diagnosing whether an abnormality exists in a valve lift-varying mechanism and a valve timing-varying mechanism.

BRIEF DESCRIPTION OF THE DRAWINGS

The foregoing and further objects, features and advantages of the invention will become apparent from the following description with reference to the following drawings, wherein like reference numerals designate like elements and wherein.

DETAILED DESCRIPTION OF PREFERRED EMBODIMENT(S)

An embodiment in which the valve characteristic control apparatus of an internal combustion engine of the invention is embodied will be described hereinafter with reference to FIGS. 1 to 8.

Figure 1:
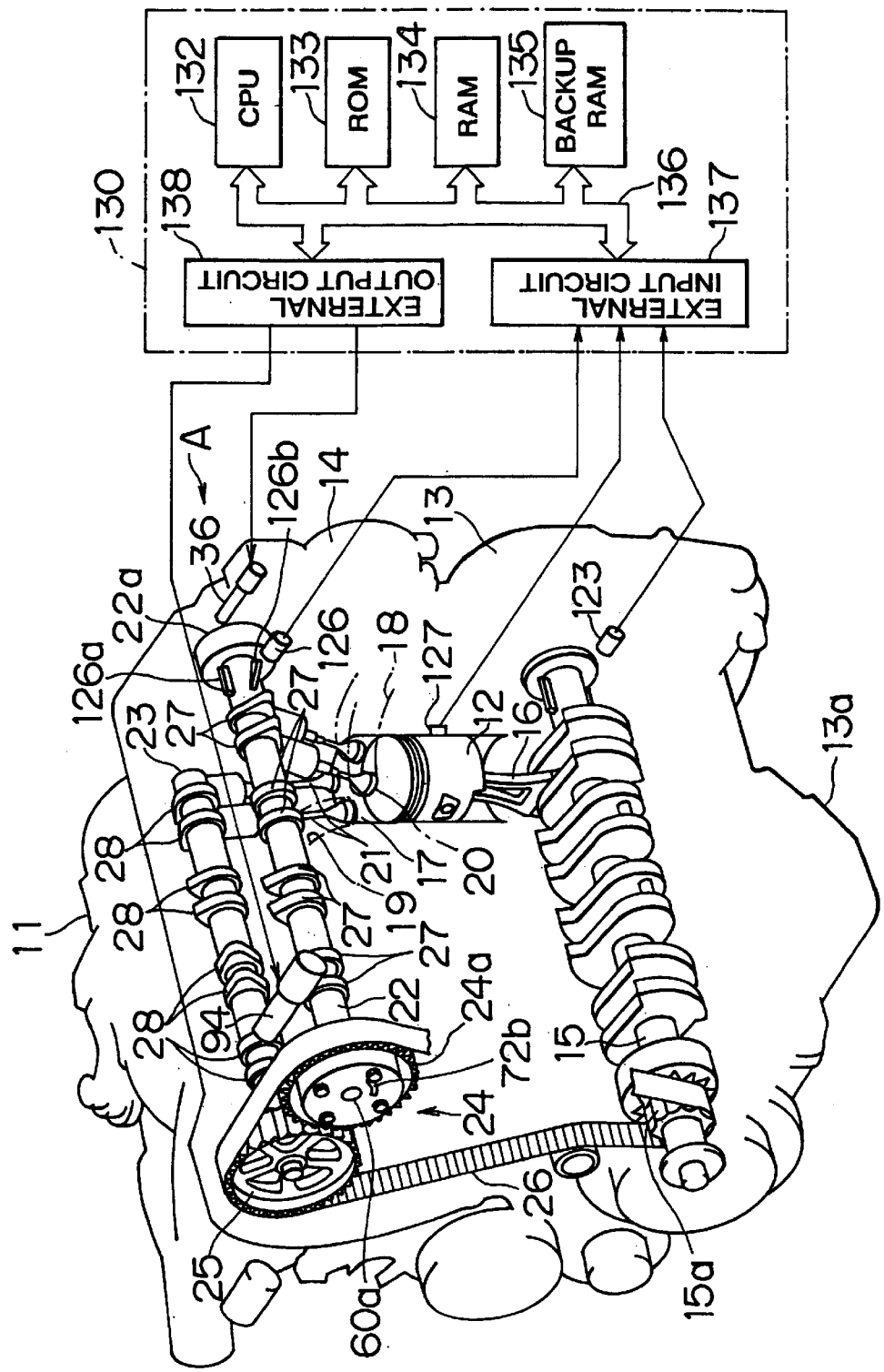
FIG. 1 is a perspective view of an embodiment in which the valve characteristic control apparatus of an internal combustion engine of the invention is embodied.

FIG. 1 shows an in-line four-cylinder gasoline engine (hereinafter "engine") 11 for installation in a vehicle as an internal combustion engine. The engine 11 has a cylinder block 13 in which reciprocating pistons 12 are provided, an oil pan 13a provided below the cylinder block 13, and a cylinder head 14 provided above the cylinder block 13.

A crankshaft 15, which is an output shaft of the engine 11 and is rotatably supported in a lower portion of the engine 11. The pistons 12 are connected to the crankshaft 15 via connecting rods 16. Reciprocating movements of the pistons 12 are converted into a rotational movement of the crankshaft 15 by the connecting rods 16. A combustion chamber 17 is formed above each piston 12. The combustion chambers 17 are connected with intake passages 18 and exhaust passages 19. The intake passages 18 and the combustion chambers 17 are connected and disconnected in communication by intake valves 20. The exhaust passages 19 and the combustion chambers 17 are connected and disconnected in communication by exhaust valves 21.

An intake-side camshaft 22 and an exhaust-side camshaft 23 are provided in parallel on the cylinder head 14. The intake-side camshaft 22 is supported on the cylinder head 14 in such a manner that the camshaft 22 is rotatable and movable in directions of an axis thereof. The exhaust-side camshaft 23 is supported on the cylinder head 14 in such a manner that the camshaft 23 is rotatable and movable in directions of an axis thereof.

A valve timing-varying actuator 24 having a timing pulley 24a is provided at an end portion of the intake-side camshaft 22. Provided at another end of the intake-side camshaft 22 is a valve lift-varying actuator 22a for moving the intake-side camshaft 22 in the directions of the axis. A timing pulley 25 is attached to an end portion of the exhaust-side camshaft 23. The timing pulley 25 and the timing pulley 24a of the valve timing-varying actuator 24 are connected to a pulley 15a attached to the crankshaft 15, via a timing belt 26. Rotation is transmitted from the crankshaft 15, which is a driving-side rotating shaft, to the intake-side camshaft 22 and the exhaust-side camshaft 23, which are driven-side rotating shafts, via the timing belt 26, so that the intake-side camshaft 22 and the exhaust-side camshaft 23 rotate synchronously with rotation of the crankshaft 15.

The intake-side camshaft 22 is provided with intake cams 27 each of which contacts an upper end of a corresponding intake valve 20. The exhaust-side camshaft 23 is provided with exhaust cams 28 each of which contacts an upper end of a corresponding exhaust valve 21. As the intake-side camshaft 22 rotates, the intake valves 20 are opened and closed by the intake cams 27. As the exhaust-side camshaft 23 rotates, the exhaust valves 21 are opened and closed by the exhaust cams 28.

Figure 2:
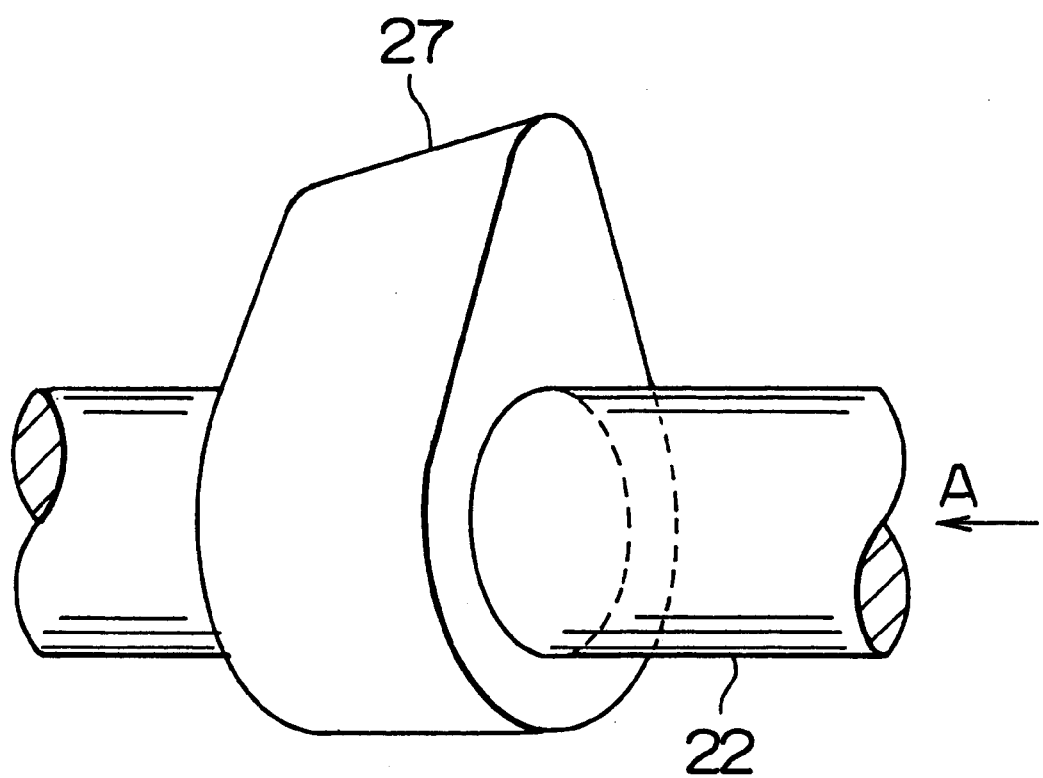
FIG. 2 is a perspective view illustrating the configuration of intake cams employed on an intake-side camshaft in the embodiment.

A cam profile of each intake cam 27 continuously changes in the directions of the axis of the intake-side camshaft 22 as shown in FIG. 2. Whereas a cam profile of each exhaust cam 28 is fixed in the directions of the axis of the exhaust-side camshaft 23. Each intake cam 27 is constructed as a three-dimensional cam.

As the intake-side camshaft 22 is moved in a direction indicated by an arrow A, the amount of valve lift of each intake valve 20 caused by the corresponding intake cam 27 gradually increases and an open valve duration of each intake valve 20 gradually increases. Conversely, as the intake-side camshaft 22 is moved in a direction opposite to the direction indicated by the arrow A, the amount of valve lift of each intake valve 20 caused by the corresponding intake cam 27 gradually decreases and the open valve duration of each intake valve 20 gradually decreases. Therefore, by moving the intake-side camshaft 22 in the direction of the axis thereof, the amount of valve lift and the open valve duration of the intake valves 20 can be adjusted.

A valve lift-varying mechanism includes a first oil control valve (OCV) 36.

The valve lift-varying actuator 22a, which moves moving the intake-side camshaft 22 in the directions of the axis thereof, and an oil supplying structure, which hydraulically drives the valve lift-varying actuator 22a will be described with reference to FIG. 3.

Figure 3:
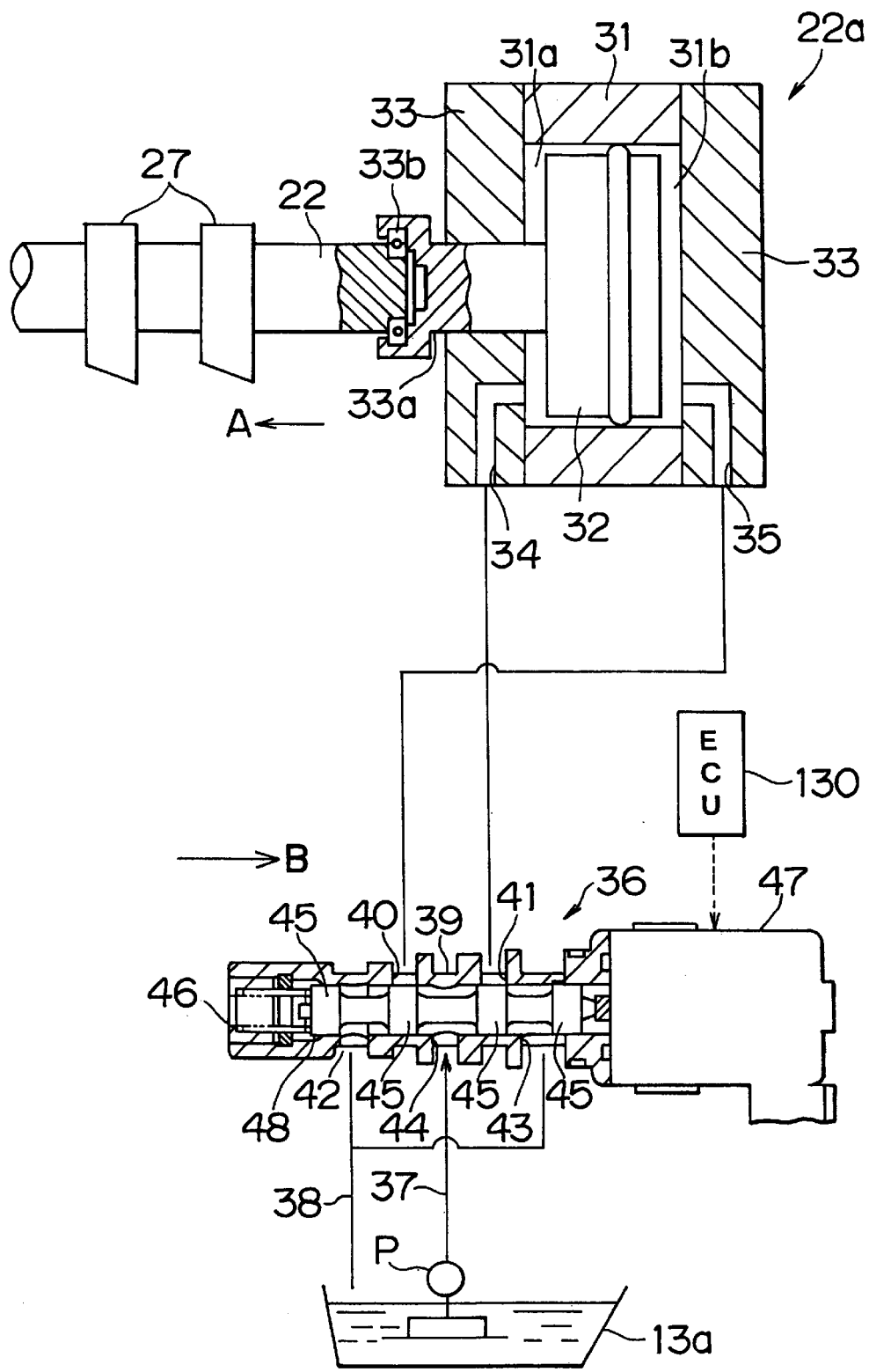
FIG. 3 is a diagram illustrating the construction of a valve lift-varying actuator.

As shown in FIG. 3, the valve lift-varying actuator 22a is made up of a tubular cylinder tube 31, a piston 32 provided in the cylinder tube 31, and pair of end covers 33 that close opposite end openings of the cylinder tube 31. The cylinder tube 31 is fixed to the cylinder head 14, which is not shown in FIG. 3.

The piston 32 is connected to the intake-side camshaft 22 via an auxiliary shaft 33a that extends through one of the end covers 33. A rolling bearing 33b is disposed between the auxiliary shaft 33a and the intake-side camshaft 22, so that the valve lift-varying actuator 22a can smoothly drive the rotating intake-side camshaft 22 via the auxiliary shaft 33a and the rolling bearing 33b.

The internal space of the cylinder tube 31 is divided into a first pressure chamber 31a and a second pressure chamber 31b by the piston 32. A first supply-discharge passage 34 is formed in one of the end covers 33. The first supply-discharge passage 34 is connected to the first pressure chamber 31a. A second supply-discharge passage 35 is formed in the other end cover 33. The second supply-discharge passage 35 is connected to the second pressure chamber 31b.

When hydraulic oil is supplied selectively to the first pressure chamber 31a or the second pressure chamber 31b via the first supply-discharge passage 34 and the second supply-discharge passage 35, respectively, the piston 32 is moved in a direction of the axis of the intake-side camshaft 22. As the piston 32 is thus moved, the intake-side camshaft 22 is moved in the same direction along the axis of the intake-side camshaft.

The first supply-discharge passage 34 and the second supply-discharge passage 35 are connected to the first oil control valve 36. A supply passage 37 and a discharge passage 38 are connected to the first oil control valve 36. The supply passage 37 is connected to the oil pan 13a via an oil pump P that is driven as the crankshaft 15 is rotated. A discharge passage 38 is directly connected to the oil pan 13a.

The first oil control valve 36 has a casing 39. The casing 39 is provided with a first supply-discharge port 40, a second supply-discharge port 41, a first discharge port 42, a second discharge port 43, and a supply port 44. The second supply-discharge passage 35 is connected to the first supply-discharge port 40. The first supply-discharge passage 34 is connected to the second supply-discharge port 41. Furthermore, the supply passage 37 is connected to the supply port 44. The discharge passage 38 is connected to the first discharge port 42 and the second discharge port 43. Provided in the casing 39 is a spool 48 having four valve portions 45. The spool 48 is urged in a direction generally indicated by arrow B by a coil spring 46 and in an opposite direction by an electromagnetic solenoid 47.

During a de-energized state of the electromagnetic solenoid 47, the spool 48 is positioned at an end side (right-hand side in FIG. 3) in the casing 39 by the elastic force of the coil spring 46, so that the first supply-discharge port 40 and the first discharge port 42 are connected in communication and the second supply-discharge port 41 and the supply port 44 are connected in communication. During the de-energize state, hydraulic oil is supplied from the oil pan 13a to the first pressure chamber 31a via the supply passage 37, the first oil control valve 36, and the first supply-discharge passage 34. Hydraulic oil within the second pressure chamber 31b is returned to the oil pan 13a via the discharge passage 38. As a result, the piston 32 and the intake-side camshaft 22 are moved in the direction opposite to the direction indicated by the arrow A.

Conversely, when the electromagnetic solenoid 47 is energized, the spool 48 is positioned at the other end side in the casing 39 (left-hand side in FIG. 3) against the elastic force of the coil spring 46, so that the second supply-discharge port 41 communicates with the second discharge port 43, and so that the first supply-discharge port 40 communicates with the supply port 44. During the energized state, hydraulic oil is supplied from the oil pan 13a to the second pressure chamber 31b via the supply passage 37, the first oil control valve 36, and the second supply-discharge passage 35. Furthermore, hydraulic oil within the first pressure chamber 31a is returned to the oil pan 13a via the first supply-discharge passage 34, the first oil control valve 36, and the discharge passage 38. As a result, the piston 32 and the intake-side camshaft 22 are moved in the direction indicated by arrow A.

Furthermore, when the supply of power to the electromagnetic solenoid 47 is controlled so as to position the spool 48 at an intermediate position in the casing 39, the first supply-discharge port 40 and the second supply-discharge port 41 are closed, so that hydraulic oil is prevented from moving via the supply-discharge ports 40 and 41. When the spool 48 is in the intermediate position, the supplying and discharging of hydraulic oil with respect to the first pressure chamber 31a and the second pressure chamber 31b is not performed, but hydraulic oil is charged and held in the first pressure chamber 31a and the second pressure chamber 31b, so that the piston 32 and the intake-side camshaft 22 are fixed in position.

Next, the valve timing-varying actuator 24 for adjusting the opening-closing timing of the intake valves 20 will be described in detail with reference to FIG. 4.

Figure 4:
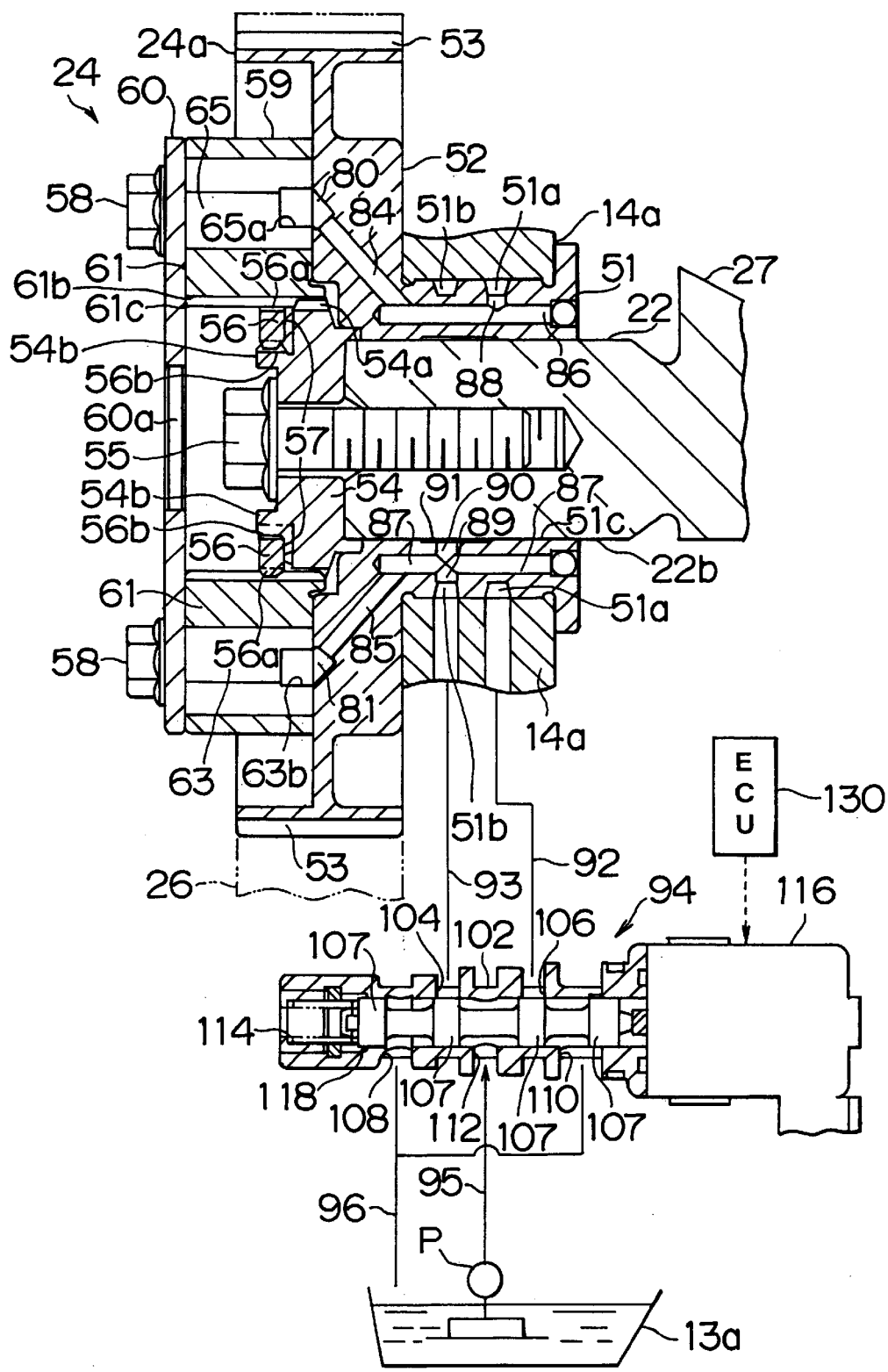
FIG. 4 is a diagram illustrating the construction of a valve timing-varying actuator.

As shown in FIG. 4, the valve timing-varying actuator 24 is provided with the timing pulley 24a. The timing pulley 24a has a tubular portion 51 through which the intake-side camshaft 22 extends, a disc plate portion 52 protruded from an outer peripheral surface of the tubular portion 51, and a plurality of outer teeth 53 formed on an outer peripheral surface of the disc plate portion 52. The tubular portion 51 of the timing pulley 24a is rotatably supported by a bearing portion 14a of the cylinder head 14. The intake-side camshaft 22 extends through the tubular portion 51 in such a manner that the intake-side camshaft 22 is slidable in the directions of the axis thereof.

Figure 5:
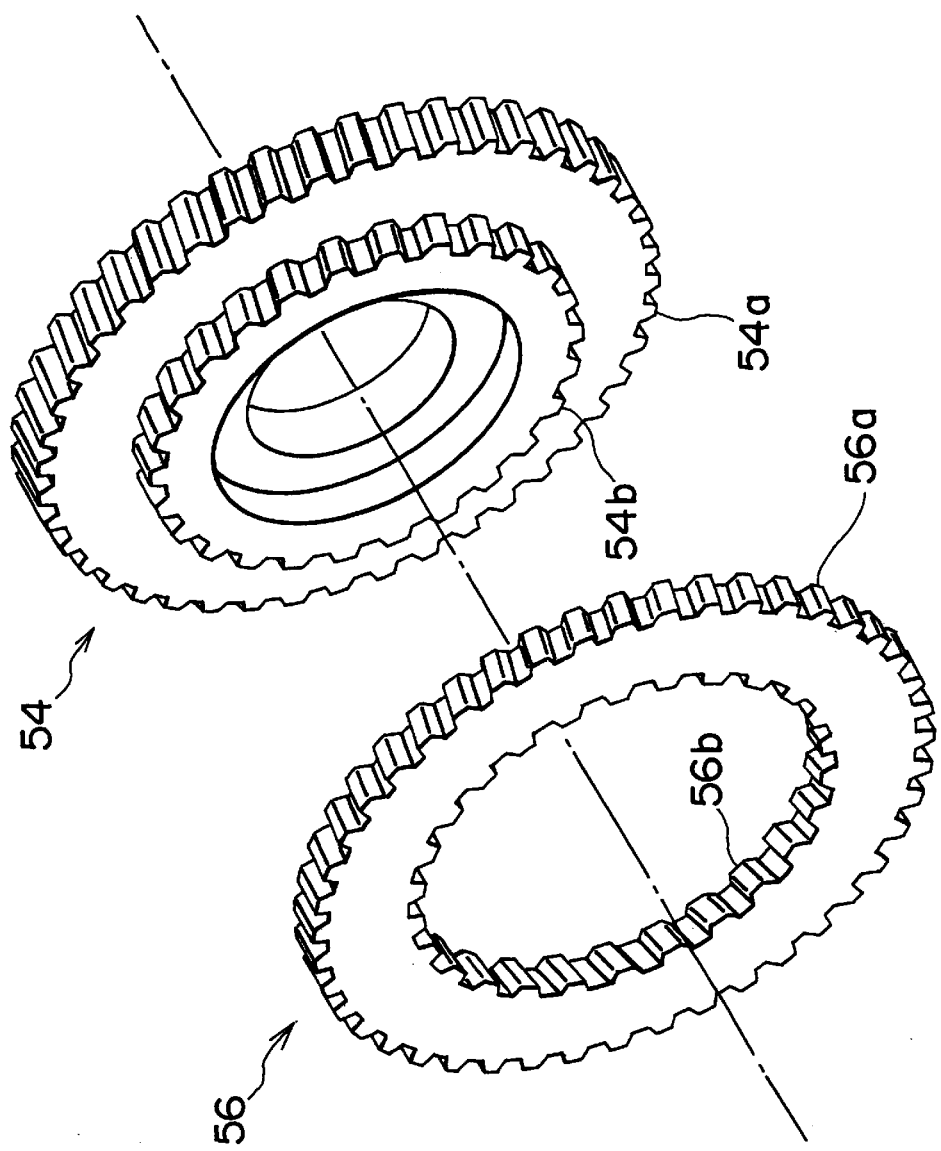
FIG. 5 is a perspective view illustrating the configurations of an inner gear and a subsidiary gear that are used in the valve timing-varying actuator.

An inner gear 54 is provided so as to cover a distal end portion of the intake-side camshaft 22, and is fixed by a bolt 55. As shown in FIG. 5 the inner gear 54 has a stepped structure in which a large-diameter gear portion 54a of helical teeth, and a small-diameter gear portion 54b of helical teeth are formed.

A subsidiary gear 56 has helical outer teeth 56a and helical inner teeth 56b, as shown in FIG. 5. The small-diameter gear portion 54b of the inner gear 54 is meshed with the helical inner teeth 56b of the subsidiary gear 56 as shown in FIG. 4. The inner gear 54 and the subsidiary gear 56 are thus meshed with each other, with a ring-shaped spring washer 57 disposed therebetween. The spring washer 57 urges the subsidiary gear 56 in such a direction of the axis as to move the subsidiary gear 56 away from the inner gear 54. The inner gear 54 and the subsidiary gear 56 have about equal outer diameters. The inclination angle of the helical teeth of each of the inner gear 54 and the subsidiary gear 56 is set to an angle that allows the helical teeth to fit to helical splines 61b that are formed at corresponding sites on a vane rotor 61.

Figure 6:
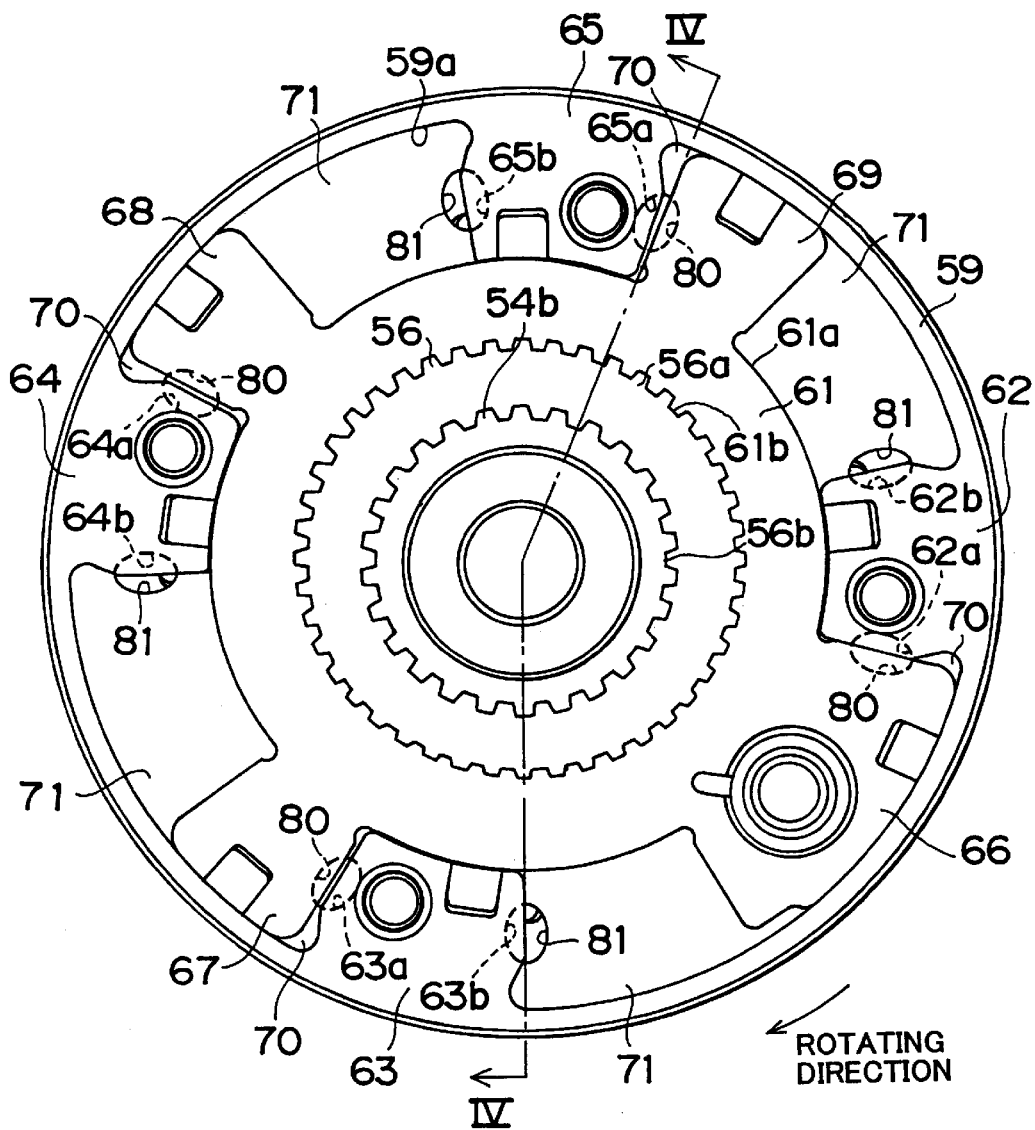
FIG. 6 is a diagram illustrating an internal construction of the valve timing-varying actuator.

A housing 59 and a cover 60 are attached to the disc plate portion 52 of the timing pulley 24a by a plurality of bolts 58. In various exemplary embodiments, four bolts are used. A first pressure chamber 70 is defined in an inner space of the housing 59 as shown in FIG. 6. A second pressure chamber 71 is defined in the inner space of the housing 59, as shown in FIG. 6. The housing 59 and the cover 60 tightly close the first pressure chamber 70 and the second pressure chamber 71, as shown in FIG. 5. The cover 60 has, at its center, a hole portion 60a, which opens to a cylindrical space 61c. The hole portion 60a allows the smooth sliding of the intake-side camshaft 22 in the directions of the axis thereof.

FIG. 6 shows a side view of constructions provided side the housing 59 taken from the left hand side of FIG. 4, where the cover 60 and the bolt 55 have been removed. The view of the valve timing-varying actuator 24 in FIG. 4 is a section taken along line IV—IV in FIG. 6.

As shown in FIG. 6, the housing 59 has a plurality of wall portions 62, 63, 64, 65 that are protruded from an inner peripheral surface 59a of the housing 59 toward a center of the housing 59. The disc-shaped vane rotor 61 is rotatably disposed in the housing 59. Outer peripheral surfaces 61a of the vane rotor 61 contact distal end surfaces of the wall portions 62, 63, 64, 65.

A cylindrical space 61c (FIG. 4) is formed in a central portion of the vane rotor 61. In this embodiment the helical splines 61b having a predetermined helix angle with respect to the direction of the axis of the intake-side camshaft 22. The aforementioned large-diameter helical gear portion 54a (not shown in FIG. 6) of the inner gear 54 and the outer helical teeth 56a of the subsidiary gear 56 are meshed with the helical lines 61b. With regard to the helix angle of the helical splines 61b, the manner of setting the helix angle and the operation thereof will be described in detail below.

The operation of the spring washer 57 (FIG. 4) and the combination of the inner helical teeth 56b of the subsidiary gear 56 and the small-diameter helical gear portion 54b of the inner gear 54 creates an urging force that turns the large-diameter gear portion 54a of the inner gear 54 and the helical outer teeth 56a of the subsidiary gear 56 in opposite directions. Therefore, backlash between the helical splines 61b and the gears 54, 56 is absorbed, so that the inner gear 54 can be disposed with a high precision with respect to the vane rotor 61, and so that impact noises therebetween can be curbed.

The disc-shaped vane rotor 61 has vanes 66, 67, 68 69 that are protruded from the outer peripheral surfaces 61a into spaces between the wall portions 62, 63, 64, 65. Due to the vanes 66, 67, 68, 69 dividing the spaces defined between the wall portions 62, 63, 64, 65, the first pressure chambers 70 and the second pressure chamber 71 are formed.

When rotation of the crankshaft 15 (FIG. 1), caused by driving the engine, is transmitted to the timing pulley 24a of the above-described valve timing-varying actuator 24 via the timing belt 26, the timing pulley 24a and the intake side camshaft 22 rotate together as one unit, with an adjusted rotation phase difference maintained. As the intake-side camshaft 22 rotates, the intake valves 20 (FIG. 1) are opened and closed as described above.

Then, if the vane rotor 61 is turned in the rotating direction relatively to the housing 59 by hydraulic control with respect to the first pressure chambers 70 and the second pressure chambers 71, that is, if a rotation phase difference adjustment control of the intake-side camshaft 22 toward an advanced side is performed with respect to the crankshaft 15, while the engine 11 is being driven, the opening-closing timing of the intake valves 20 is advanced.

Conversely, if the vane rotor 61 is turned in the direction opposite to the rotating direction relatively to the housing 59, that is, if a rotation phase difference adjustment control of the intake-side camshaft 22 toward a retarded side is performed with respect to the crankshaft 15, the opening-closing timing of the intake valves 20 is retarded.

Normally, the opening-closing timing of the intake valves 20 is retarded when the revolution speed of the engine 11 is low. The opening-closing timing thereof is advanced when the revolution speed of the engine 11 is high. This operation is intended to stabilize the revolution of the engine 11 during low-speed engine operation, and to improve the efficiency of drawing mixture gas into the combustion chambers 17 during high-speed operation of the engine 11.

Next described will be a structure in the valve timing-varying actuator 24 that hydraulically controls the rotation phase difference between the housing 59 and the vane rotor 61 for adjusting the opening-closing timing of the intake valves 20.

As shown in FIG. 6, a timing advancement oil passage opening portion 80 is formed at a first pressure chamber 70 side of each wall portion 62, 63, 64 and 65 protruded inwards from the housing 59, and a timing retardation oil passage opening portion 81 is formed at a second pressure chamber 71 side of each wall portion 62, 63, 64 and 65. A disc plate portion 52 side portion (FIG. 4) of each wall portion 62, 63, 64 and 65 that contacts the adjacent timing advancement oil passage opening portion 80 has a recess 62a, 63a, 64a and 65a that makes it possible to apply a hydraulic pressure for turning the vane rotor 61 in the timing advancing direction even when the timing advancement oil passage opening portions 80 are closed by the vanes 66, 67, 68 and 69. Similarly, a disc plate portion 52 side portion (FIG. 4) of each wall portion 62, 63, 64 and 65 that contacts the adjacent timing retardation oil passage opening portion 81 has a recess 62b, 63b, 64b and 65b that makes it possible to apply a hydraulic pressure for turning the vane rotor 61 in the timing retarding direction even when the timing retardation oil passage opening portions 81 are closed by the vanes 66, 67, 68 and 69.

The timing advancement oil passage opening portions 80 are connected to an outer peripheral groove 51a via timing advancement control oil passages 84 formed in the disc plate portion 52, and via timing advancement control oil passage 86 and 88 formed in the tubular portion 51, as shown in FIG. 4. The timing retardation oil passage opening portions 81 are connected to another outer peripheral groove 51b via timing retardation control oil passages 85 formed in the disc plate portion 52, and via timing retardation control oil passages 87 and 89 formed in the tubular portion 51, as shown in FIG. 4.

Lubricating oil passages 90 branching from the timing retardation control oil passages 87 in the tubular portion 51 are connected to an increased-width inner peripheral groove 91 that is formed in an inner peripheral surface 51c of the tubular portion 51, as shown in FIG. 4. Hydraulic oil flowing in the timing retardation control oil passages 87 is led via lubricating oil passages 90 and inner peripheral groove 91 to a clearance between the inner peripheral surface 51c of the tubular portion 51 and an end-portion outer peripheral surface 22b of the intake-side camshaft 22, as lubricating oil.

The outer peripheral groove 51a of the tubular portion 51 is connected to a second oil control valve 94 via a timing advancement control oil passage 92, as shown in FIG. 4. The outer peripheral groove 51b of the tubular portion 51 is connected to the second oil control valve 94 via a timing retardation control fluid passage 93.

A supply passage 95 and a discharge passage 96 connected to the second oil control valve 94. The supply passage 95 is connected to the oil pan 13a via the same oil pump P that is used for the first oil control valve 36 (FIG. 3). The discharge passage 96 is directly connected to the oil pan 13a. The oil pump P delivers hydraulic oil from the oil pan 13a into the supply passages 37 (FIG. 3) and 95.

The second oil control valve 94 is constructed substantially in the same manner as the first oil control valve 36. That is, the second oil control valve 94 has a casing 102, a first supply-discharge port 104, a second supply-discharge port 106, a valve portion 107, a first discharge port 108, a second discharge port 110, a supply port 112, a coil spring 114, an electromagnetic solenoid 116, and a spool 118. The timing retardation control fluid passage 93, which is formed in the cylinder head 14, is connected to the first supply-discharge port 104. The timing advancement control oil passage 92, which is formed in the cylinder head 14, is connected to the second supply-discharge port 106. The supply passage 95 is connected to the supply port 112. The discharge passage 96 is connected to the first discharge port 108 and the second discharge port 110.

Therefore, during a de-energized state of the electromagnetic solenoid 116, the spool 118 is positioned at an end side (right-hand side in FIG. 4) in the casing 102 by the elastic force of the coil spring 114, so that the first supply-discharge port 104 and the first discharge port 108 are connected in communication and the second supply-discharge port 106 and the supply port 112 are connected in communication. During the de-energized state, hydraulic oil is supplied from the oil pan 13a to the first pressure chambers 70 of the valve timing-varying actuator 24, via the supply passage 95, the second oil control valve 94, the timing advancement control oil passage 92, the outer peripheral groove 51a, the timing advancement control oil passages 88, the timing advancement control oil passages 86, the timing advancement control oil passages 84, the timing advancement oil passage opening portions 80, and the recesses 62a, 63a, 64a, 65a. Hydraulic oil is returned from the second pressure chambers 71 of the valve timing-varying actuator 24 into the oil pan 13a, via the recesses 62b, 63b, 64b, 65b, the timing retardation oil passage opening portions 81, the timing retardation control fluid passages 85, the timing retardation control fluid passages 87, the timing retardation control fluid passages 89, the outer peripheral groove 51b, the timing retardation control fluid passage 93, the second oil control valve 94, and the discharge passage 96. As a result, the vane rotor 61 is relatively turned in the timing advancing direction with respect to the housing 59, thereby advancing the opening-closing timing of the intake valves 20 as aforementioned.

Conversely, when the electromagnetic solenoid 116 is energized, the spool 118 is positioned at the other end side (left hand side in FIG. 4) in the casing 102 against the elastic force of the coil spring 114, so that the second supply-discharge port 106 and the second discharge port 110 are connected in communication and the first supply-discharge port 104 and the supply port 112 are connected in communication. During the energized state, hydraulic oil is supplied from the oil pan 13a to the second pressure chamber 71 of the valve timing-varying actuator 24, via the supply passage 95, the second oil control valve 94, the timing retardation control fluid passage 93, the outer peripheral groove 51b, the timing retardation control fluid passages 89, the timing retardation control fluid passages 87, the timing retardation control fluid passages 85, the timing retardation oil passage opening portions 81 and the recesses 62b, 63b, 64b, 65b. Furthermore, hydraulic oil is returned from the first pressure chambers 70 of the valve timing-varying actuator 24 into the oil pan 13a, via the recesses 62a, 63a, 64a, 65a, the timing advancement oil passage opening portions 80, the timing advancement control oil passages 84, the timing advancement control oil passages 86, the timing advancement control oil passages 88, the outer peripheral groove 51a, the timing advancement control oil passage 92, the second oil control valve 94, and the discharge passage 96. As a result, the vane rotor 61 is relatively turned in the timing retarding direction with respect to the housing 59, thereby retarding the opening-closing timing of the intake valves 20 as aforementioned.

Furthermore, when the supply of power to the electromagnetic solenoid 116 is controlled so as to position the spool 118 at an intermediate position in the casing 102, the first supply-discharge port 104 and the second supply-discharge port 106 are closed, so that hydraulic oil is prevented from moving via the supply-discharge ports 104 and 106. When the spool 118 is in the intermediate position, the supplying an discharging of hydraulic oil with respect to the first pressure chambers 70 or the second pressure chambers 71 is not performed, but hydraulic oil is charged and held in the first pressure chambers 70 and the second pressure chamber 71, so that the turning of the vane rotor 61 relative to the housing 59 stops. As a result, the opening-closing timing of the intake valves 20 is held at a state set by the positional fixation of the vane rotor 61.

The valve timing-varying mechanism in this embodiment includes the valve timing-varying actuator 24, and the second oil control valve (OCV) 94.

In the valve lift-varying mechanism and the valve timing-varying mechanism described above, the OCV 36 and the OCV 94, respectively, are driven and controlled by an electronic control unit (hereinafter, referred to as "ECU") 130. The ECU 130, controls the changing of the opening-closing characteristic of the intake valves 20. As shown in FIG. 1, the ECU 130 is constructed as a logic operation circuit having a CPU 132, a ROM 133, a RAM 134, a backup RAM 135, etc.

The ROM 133 is a memory storing various control programs, and tables and maps that are referred to at the time of execution of the various control programs, and the like. The CPU 132 executes calculation processes needed for controls based on the various control programs stored in the ROM 133. The RAM 134 is a memory for temporarily storing results of calculation processes executed by the CPU 132, data inputted from various sensors, and the like. The backup RAM 135 is a non-volatile memory for storing data that needs to be retained when the engine 11 is stopped. The CPU 132, the ROM 13 the RAM 134 and the backup RAM 135 are interconnected via a bus 136, and are connected to an external input circuit 137 and an external output circuit 138.

The external input circuit 137 is connected to various sensors for detecting operation states of the engine 11, such as an intake pressure sensor (not shown), a throttle sensor (not shown), etc., and to a crank angle sensor 123 and a cam angle sensor 126. The external output circuit 138 is connected to the OCV 36 and the OCV 94.

In this embodiment, the valve characteristic control of the intake valves 20 is performed through the ECU 130 constructed as described above. Due to the setting of the helix angle of the helical splines 61b mentioned above, a control is performed such that a fixed valve opening timing of the intake valves 20 is maintained and the valve closing timing thereof is changed when the intake-side camshaft 22 is displaced in the direction of the axis thereof, even when three-dimensional cams are employed.

The aforementioned construction is intended to avoid the following problems caused when a finer valve characteristic control is performed using a combination of the valve lift-varying actuator and the valve timing-varying actuator 24. That is, in order to accurately determine a valve timing, a mere control of the valve timing-varying actuator 24 alone is not sufficient, but it becomes necessary to consider the operational condition of the valve lift-varying actuator 22a, which determines a valve lift characteristic. The matching of the amounts of control caused by the actuators becomes complicated.

Therefore, this embodiment avoids the aforementioned problems by employing the helical splines 61b, that is, by setting the helix angle of the helical splines 61b to a crank angle difference between the valve opening timing of the intake valves at the time of a maximum amount of valve lift and the valve opening timing of the intake valves at the time of a minimum amount of valve lift.

In the valve characteristic control of the intake valves 20, therefore, it becomes possible to control the valve characteristics of the intake valves 20 to desired values by controlling the valve timing-varying mechanism for the valve opening timing control, and the valve lift-varying mechanism for the amount of valve lift, independently of each other.

The valve characteristic related to the control of the valve lift-varying mechanism and the valve timing-varying mechanism performed by the ECU 130 is calculated based on results of detection performed by the cam angle sensor 126 and the crank angle sensor 123.

As shown in FIG. 1, the intake-side camshaft 22 is provided with two kinds of detected portions, a reference-purposed detected portion 126a linearly extending in the directions of the axis of the shaft 22 and a moving amount-purposed detected portion 126b extending in a helical manner in the directions of the axis of the shaft 22. The cam angle sensor 126, provided adjacent to the detected portions 126a and 126b, generates pulses corresponding to the pass of the detected portions 126a and 126b during rotation of the intake-side camshaft 22, whereby the variably controlled amount of valve lift is monitored. In this case, the pulse generation timing of pulses generated by the cam angle senor 126 corresponding to the pass of the moving amount-purposed detected portion 126b with respect to the pulse generated by the cam angle sensor 126 corresponding to the pass of the reference-purposed detected portion 126a changes as the intake-side camshaft 22 is moved in the directions of the axis thereof. By monitoring changes in the pulse generation timing, it is possible to detect the displaced position of the intake-side camshaft 22 in the directions of the axis, that is, the amount of valve lift.

On other hand, the variably controlled valve timing is monitored by calculating the rotation phase difference between the crankshaft 15 and the camshaft 22 based on results of detection of the reference-purposed detected portion 126a performed by the cam angle sensor 126 and results of detection performed by the crank angle sensor 123.

Therefore, it becomes possible to detect control values of the valve lift-varying mechanism and the valve timing-varying mechanism as a detected lift amount and a detected valve timing value, in the above-described manner.

Next described will be an abnormality diagnostic method for the valve characteristic control apparatus of this embodiment. An abnormality diagnostic method for the valve lift-varying mechanism will first be described.

In this embodiment, the abnormality diagnosis of the valve lift-varying mechanism is basically performed in the following manner.

(A) It is diagnosed that there is an abnormality, provided that a deviation between a target amount of valve lift and a detected amount of valve lift is greater than a predetermined value and that the amount of change in the detected amount of valve lift is smaller than a predetermined value.

(B) It is diagnosed that there is an abnormality, provided that the amount of change in the detected amount of valve lift is greater than a predetermined value although a state where a retainment instruction is outputted has continued for a predetermined duration.

(C) It is diagnosed that there is an abnormality, provided that the deviation between the target amount of valve lift and the detected amount of valve lift is greater than the predetermined value, and that the state where an instruction to retain the amount of valve lift is outputted is present, and that there is no abnormality in the retainment control system.

In the abnormality diagnosis (A), it is determined that there is an abnormality (operation abnormality), provided that the amount of change in the detected amount of valve lift is less than the predetermined value although there is a great difference between the detected amount of valve lift and the target amount of valve lift, that is, provided that the target amount of valve lift is not being approached.

In the abnormality diagnosis (B), it is diagnosed that there is an abnormality related to the retainment control (retainment control abnormality), if the amount of change in the detected amount of valve lift is greater than the predetermined value when the retainment instruction continues for the predetermined duration and therefore it is considered that the detected amount of valve lift should be in a retained state.

In the abnormality diagnosis (C), it is diagnosed that there is an abnormality (operation abnormality) if there is a great deviation between the target amount of valve lift and the detected amount of valve lift during a state where the retainment instruction has been outputted although there is no abnormality in the retainment system.

Figure 7:
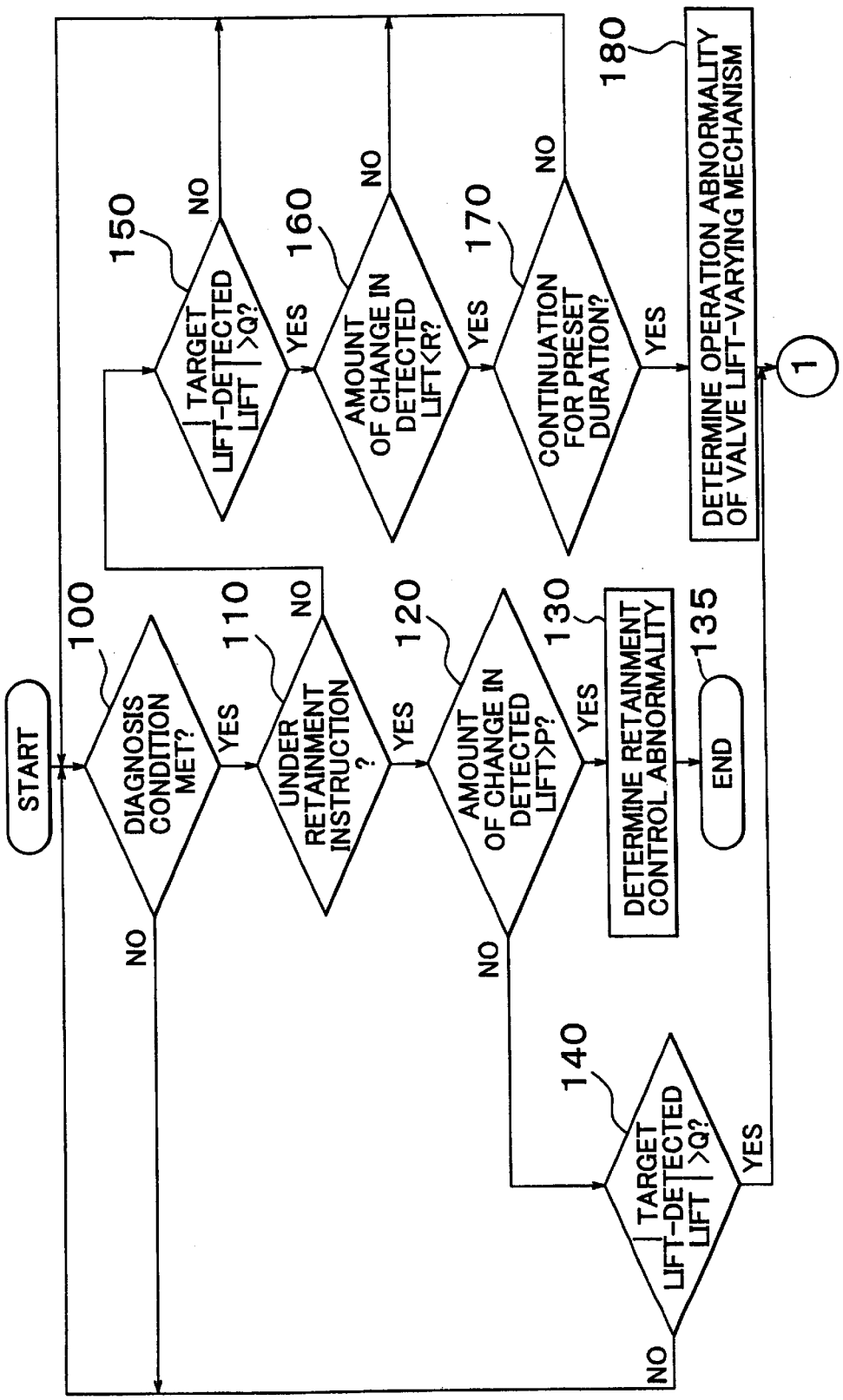
FIG. 7 is a flowchart illustrating a procedure of a valve characteristic control (abnormality diagnosis) of one exemplary embodiment of the invention.
Figure 8:
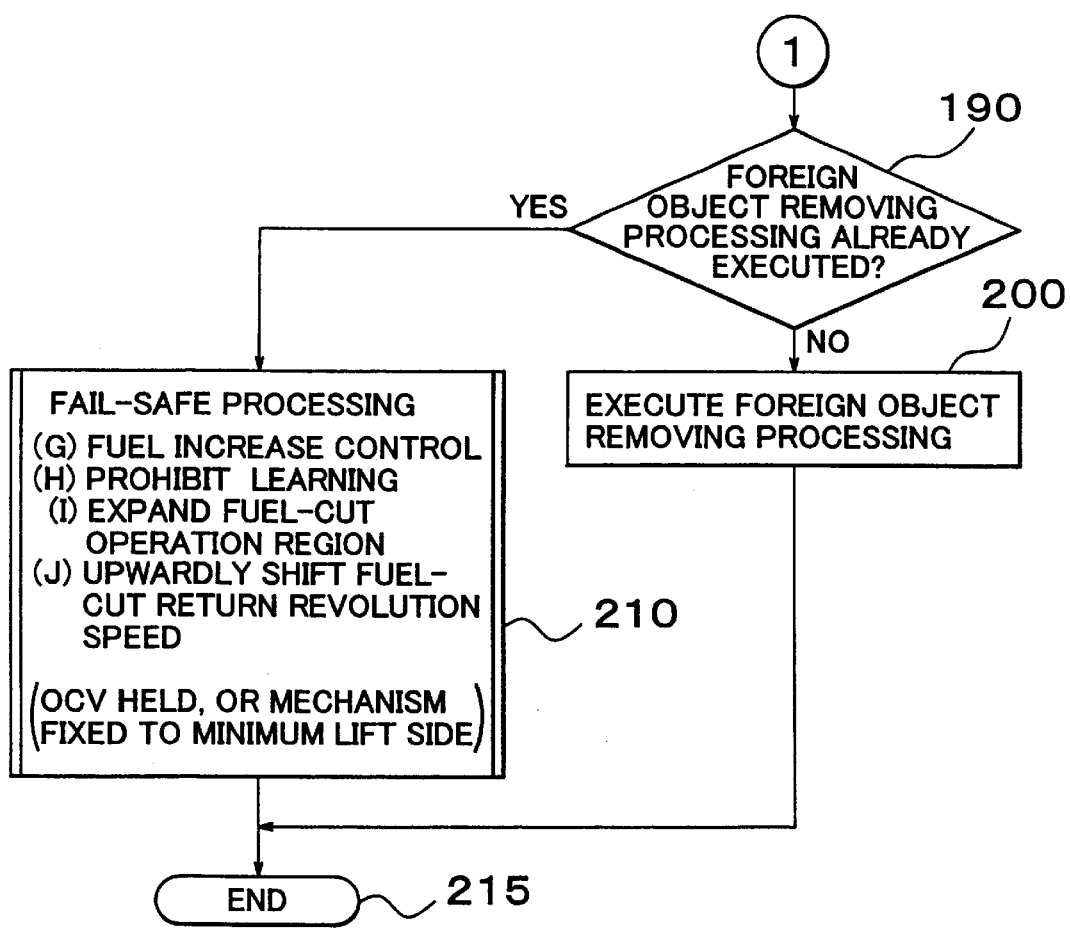
FIG. 8 is a flowchart illustrating the procedure of the valve characteristic control (abnormality diagnosis) of one exemplary embodiment of the invention.

Next, a specific abnormality diagnostic procedure or the valve lift-varying mechanism in accordance with this embodiment regarding the abnormality diagnoses (A) to (C) will be described with reference to FIGS. 7 and 8. FIGS. 7 and 8 show a flowchart illustrating a diagnostic procedure regarding an abnormality of the valve lift-varying mechanism.

This process is started on a condition that a diagnosis condition indicated in step 100 is met. In various exemplary embodiments, the process is started by, for example, an interrupt at every predetermined time, based on a suitable flag process, a suitable counting process, or the like. In one exemplary embodiment, in step 100, it is diagnosed whether the following apt diagnosis conditions (c1) and (c2) regarding the engine revolution speed NE and a result of detection performed by a water temperature sensor 127 (i.e., engine water temperature THW) are met. In various exemplary embodiments, the condition (c1) and (c2) are as follows:

500 rpm<NE<4000 rpm                          (c1)

80° C.<THW<110° C.                              (c2)

The condition (c1) is set because the precision in detecting the amount of valve lift becomes low if the revolution speed of the engine 11 is excessively low or excessively high. The condition (c2) is set taking it into consideration that there is a case where the operation of the valve lift-varying actuator 22a becomes unstable under a condition of low temperature or high temperature of the hydraulic oil supplied to the valve lift-varying actuator 22a. If at least one of the conditions (c1) and (c2) is not met, the process waits until the conditions are met.

If it is determined in step 100 that both the condition (c1) and the condition (c2) are met, the process proceeds to step 110. In step 110, it is determined whether a retainment control instruction has been outputted to the valve lift-varying mechanism. If it is determined that the retainment instruction has been outputted, the process proceeds to step 120.

In step 120, it is determined whether the amount of change in the detected amount of valve lift is greater than a predetermined value P. If the amount of change in the detected amount of valve lift is greater than the predetermined value P, the process proceeds to step 130, in which it is determined that there is an abnormality regarding the retainment control (retainment control abnormality). After that, the process ends in step 135. The series of processing of steps 110, 120, 130 corresponds to the diagnosis (B).

Conversely, if in step 120, the amount of change in the detected amount of valve lift is at most the predetermined value P, it is considered that there is no abnormality regarding the retainment control state, and the process proceeds to step 140. In step 140, it is determined whether the deviation between the target amount of valve lift and the detected amount of valve lift is greater than a predetermined value Q. If in step 140, the deviation is at most predetermined value Q, the process returns to the processing of step 100, that is, the processing of determining whether the diagnosis condition is met.

Conversely, if in step 140, the deviation is greater than the predetermined value Q, the process proceeds to step 180, in which it is determined that there is an operation abnormality of the valve lift-varying mechanism. The series of processing of steps 110, 120, 140, 180 corresponds to the diagnosis (C).

If it is determined in step 110 that the valve lift-varying mechanism is not in the retainment control state, the process proceeds to step 150. In step 150, it is determined whether the deviation between the target amount of valve lift and the detected amount of t& valve lift is greater than the predetermined value Q. If in step 150, the deviation is at most the predetermined value Q, then the process returns to the processing of step 100, that is, the diagnosis condition satisfaction determining process.

Conversely, if in step 150 the deviation is greater than the predetermined value Q, the process proceeds to step 160. In step 160, it is determined whether the amount of change in the detected amount of valve lift is less than a predetermined value R. If it is determined in step 160 that the amount of change in the detected amount of valve lift is not less than the predetermined value R, the process also returns to the diagnosis condition satisfaction determining processing of step 100.

Conversely, if it is determined in step 160 that the amount of change in the detected amount of valve lift is less than the predetermined value R, the process proceeds to step 170, in which it is determined whether a state where the amount of change in the detected amount of valve lift is less than the predetermined value R has continued for a predetermined duration. If it is determined in step 170 that the state has not continued for the predetermined duration, the process also returns to the processing of step 100, that is, the diagnosis condition satisfaction determining processing. Conversely, if it is determined in step 170 that the state has continued for the predetermined duration, it is determined in step 180 that there is an operation abnormality of the valve lift-varying mechanism. The series of processing of steps 150 to step 180 corresponds to the diagnosis (A).

In this embodiment, if it is determined in step 180 that there is an operation abnormality of the valve lift-varying mechanism, it is determined in step 190 whether a foreign object removing process has been performed, as shown in FIG. 8. If it is determined in step 190 that a foreign object removing process has not been performed, then a foreign object removing processing for resuming a normal state is performed in step 200.

Examples of the foreign object removing processing include but are not limited to:

(D) A full open instruction is given to the OCV 36, FIGS. 1 and 3.

(E) An open-close instruction is given to the OCV 36, FIGS. 1 and 3, in a long repetition cycle.

(F) The spool 48, FIG. 3, is oscillated by giving an open-close instruction to the OCV 36, FIGS. 1 and 3 in a long repetition cycle.

If the aforementioned operational abnormality is caused by, for example, a small metal chip or the like trapped between the supply port 44, FIG. 3, and a valve portion 45, FIG. 3 the foreign object can be removed and a normal state be resumed by forcibly operating the OCV 36 through the foreign object removing processing.

The process ends in step 215.

If the abnormality continues after the processing for removing a foreign object is performed in step 200 and it is determined in step 190 that a foreign object removing process has previously been performed, basically indicating that the abnormality is continuing, the process proceeds to step 210.

In step 210, a fail-safe process is executed while the valve lift-varying mechanism is controlled and fixed to a state by maintaining the present state of the OCV 36, or while the valve lift-varying mechanism is fixed to a minimum lift side. Examples of the fail-safe process include, but are not limited to:

(G) The fuel supplied to the engine 11 is increased.

(H) The learning related to the idle revolution speed control or the air-fuel ration feedback control is prohibited.

(I) The fuel-cut operation region is expanded.

(J) The fuel-cut return revolution speed is shifted upwards to a higher value.

The process (G) of increasing the fuel supplied to the engine 11 is intended to avoid stalling the engine 11 by increasing the idle revolution speed. If the amount of valve lift is fixed to a great value, for example, during idling, the valve overlap becomes excessively great and results in a reduced compression ratio, which causes the engine 11 to stall.

The process (H) of prohibiting the learning related to the idle revolution speed control and the air-fuel ratio feedback control is intended to avoid a danger of an undesirable operation state of the engine 11 caused after the return to normal state due to the idle revolution speed control or the air-fuel ratio feedback control based on a value learned at the time of an abnormality of the valve lift-varying mechanism.

The process (I) of expanding the fuel-cut operation region is intended to avoid the following danger. Due to a fail-safe process of controlling and fixing the actual amount of valve lift to an excessively great value when the target amount of valve lift does not become a great value, for example, during a low-load operation or the like, exhaust gas flows back into the intake system so that, for example, a misfire may be caused, or the occurrence of a misfire may damage a catalyst, or the discharge of unburned gas may excessively heat the catalyst.

The process (J) of upwardly shifting the fuel-cut return revolution speed is intended to avoid the following danger. That is, if a fuel-cut is performed when the combustion state of the engine 11 is unstable due to an excessive valve overlap caused by an abnormality of the 164 valve lift-varying mechanism, the engine revolution speed may fall and may result in stalling the engine 11.

With regard to the abnormality diagnosis of the valve lift-varying mechanism, including subsequent processes, a series of processes as described above is performed. As for the fail-safe processes (G)–(J), more than one of them may be simultaneously executed in accordance with the circumstances.

The abnormality diagnosis regarding the valve timing-varying mechanism, on the other hand, is performed based on, for example, determination that a deviation between a target valve timing and a detected valve timing is at least a first predetermined value and that the amount of change in the detected valve timing is at most a second predetermined value, as described in, for example, Japanese Patent Application Laid-Open No. 8-232617.

It is possible to diagnose whether there is an abnormality in the valve lift-varying mechanism and the valve timing-varying mechanism by performing the series of processes illustrated in FIGS. 7 and 8 with respect to the valve lift-varying mechanism and by performing the processes as described above with respect to the valve timing-varying mechanism. However, in this embodiment, since the valve lift-varying mechanism and the valve timing-varying mechanism are used in a combined manner, there is a danger of causing a reduction in the diagnosis precision, particularly when the mechanisms are simultaneously operated.

Therefore, in this embodiment, if it is diagnosed that there is an abnormality in the valve lift-varying mechanism or the valve timing-varying mechanism, it is determined whether an operation instruction was outputted to the mechanism other than the abnormality diagnosis-object mechanism at the time of the abnormality diagnosis. If it is determined that the operation instruction was outputted at that time, the valve lift-varying mechanism is temporarily operated forcibly to a minimum valve lift position. Subsequently, under that condition, it is determined again whether there is an abnormality, so as to precisely distinguish which one of the valve lift-varying mechanism and the valve timing-varying mechanism has the abnormality.

Figure 9:
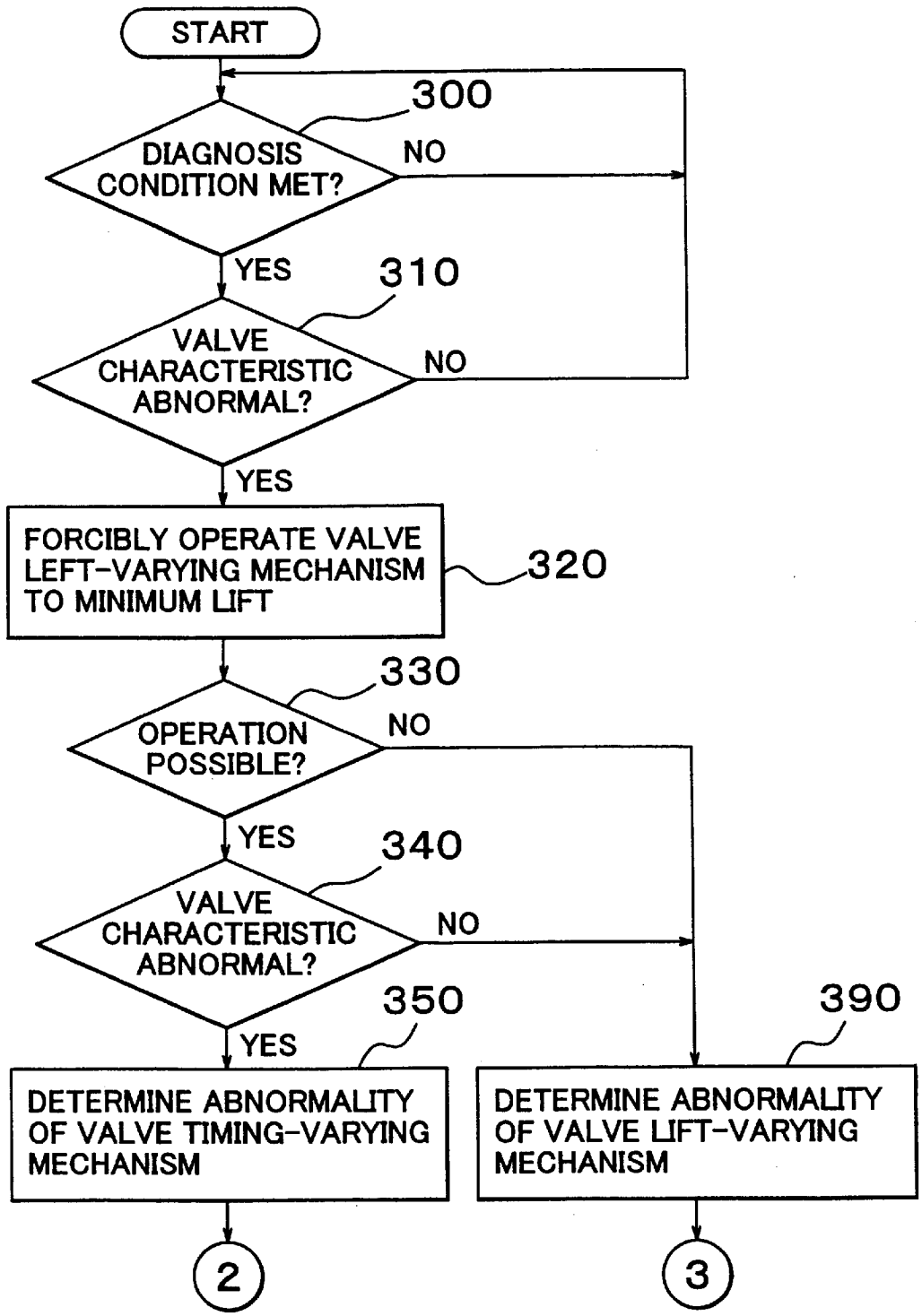
FIG. 9 is a flowchart illustrating a procedure of a valve characteristic control (abnormality diagnosis) of one exemplary embodiment of the invention.
Figure 10:
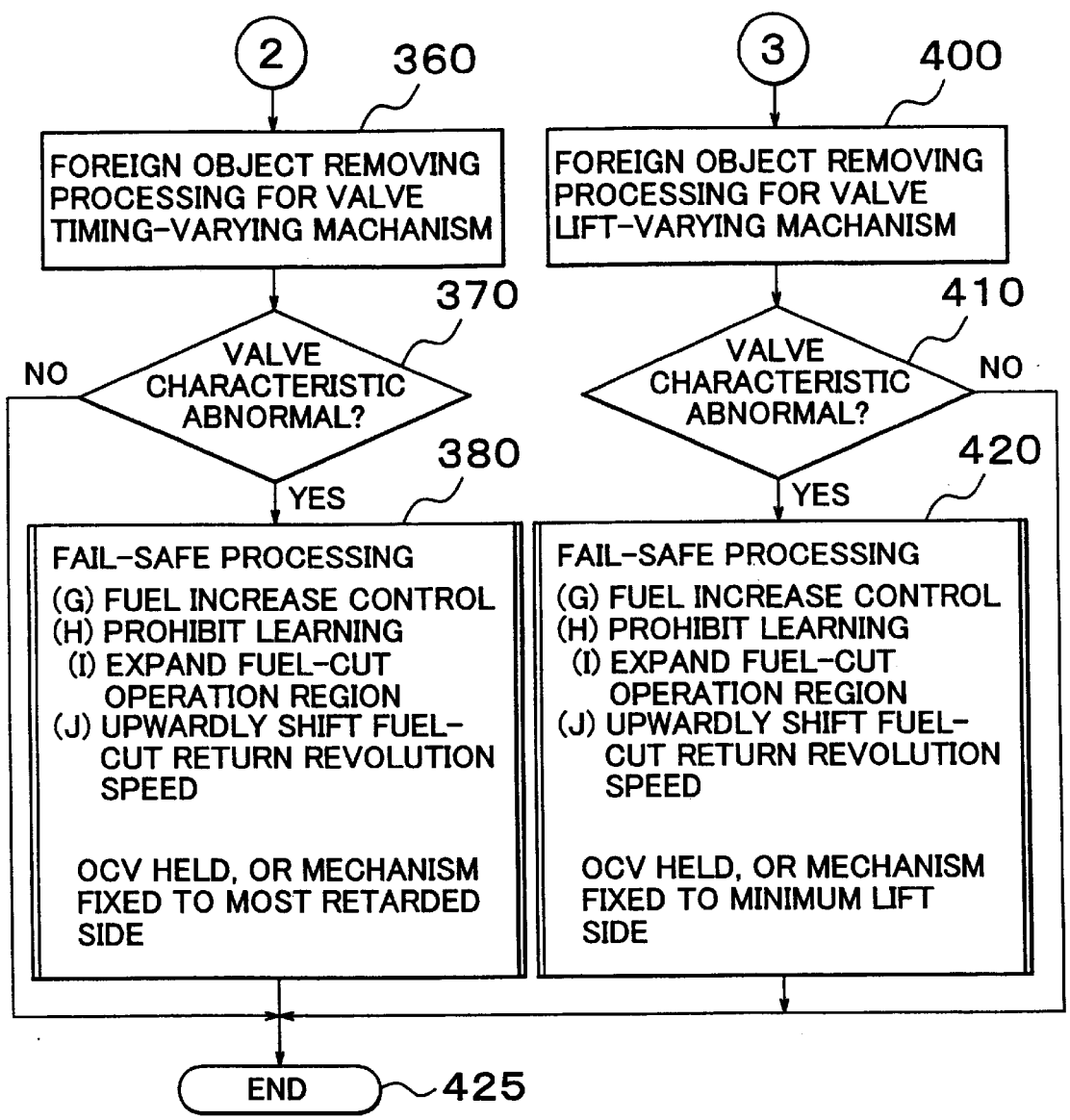
FIG. 10 is a flowchart illustrating the procedure of valve characteristic control (abnormality diagnosis) of one exemplary embodiment of the invention.

FIGS. 9 and 10 shows a flowchart illustrating a process for executing the above-identified distinguishment. With reference to FIGS. 9 and 10, a processing procedure of identifying which one of the valve lift-varying mechanism and the valve timing-varying mechanism has an abnormality is described below.

In step 300 as shown in FIG. 9, it is determined whether the aforementioned diagnosis conditions (c1) and (c2) are met. If the conditions are met, the process proceeds to step 310. In step 310, it is determined whether there is a valve characteristic abnormality during the abnormality diagnosis for the valve lift-varying mechanism the abnormality diagnosis for the valve timing-varying mechanism and, during the diagnosis, an operation instruction is outputted to the mechanism other than the abnormality diagnosis-object mechanism.

If it is determined in step 300 and step 310 that the conditions in both steps are met, the process proceeds to step 320. In step 320, the valve lift varying mechanism is forcibly operated to a minimum valve lift state. In step 330, it is determined whether the operation has been successful, that is, whether the forcible operation has been normally accomplished. If the valve lift-varying mechanism is not fixed to the minimum valve lift state despite the output of the forcible operation instruction (if the operation is impossible), the process proceeds to step 390, in which it is determined that there is an abnormality in the valve lift-varying mechanism.

Conversely, if it is verified in step 330 that the valve lift-varying mechanism has been forcibly controlled to the minimum valve lift state, it is determined in step 340 again whether there is a valve characteristic abnormality.

If it is determined in step 340 that there is an abnormality in the valve characteristic, the process proceeds to S350, wherein it is determined that the abnormality exits in the valve timing-varying mechanism. Subsequently, the process proceeds to step 360 in FIG. 10.

In step 360, a foreign object removing process is performed for the OCV 94, FIG. 4, in, for example, one of the aforementioned manners. The process then proceeds to step 370. If the execution of the foreign object removing process has removed the abnormality, it is determined in step 370 that the normal state has been resumed, and this process ends at step 425.

Conversely, if it is determined in step 370 that the abnormality remains even after the execution of the foreign object removing processing, a fail-safe process as exemplified above as (G)–(J) is executed while the OCV 94 is held or the valve timing is fixed to the most retarded timing in step 380. Subsequently, the processends at step 425.

If it is determined in step 340 (FIG. 9) that there is no abnormality in the valve characteristic, the process proceeds to step 390, in which it is determined that there is an abnormality in the valve lift-varying mechanism.

After it is determined in step 390 that there is an abnormality in the valve lift-varying mechanism, the process proceeds to step 400 in FIG. 10, wherein a foreign object removing process is executed for the OCV 36 in, for example, one of the aforementioned manners.

In step 410, a verification similar to that for step 370 is executed. If it is determined that the abnormality remains even after the execution of the foreign object removing process, a fail-safe process as exemplified above as (G)–(J) is suitably executed while the OCV 36 is held or the amount of valve lift is fixed to the minimum valve lift side. Subsequently, the processends at step 425.

According to the embodiment, in which the abnormality diagnosis and the subsequent processing are performed in the above-described manner and procedure, the following advantages are achieved.

(1) It is diagnosed whether there is an abnormality regarding the valve lift-varying mechanism by referring to not only the deviation between the detected amount of valve lift and the target amount of valve lift related to the control of the valve lift-varying mechanism but also the amount of change in the detected amount of valve lift. Therefore, the abnormality diagnosis regarding the operation control can be precisely performed.

(2) If the amount of change in the detected amount of valve lift is greater than the predetermined value P when the retainment instruction has been outputted to the valve lift-varying mechanism for a predetermined duration, an abnormality is determined. Therefore, it is possible to precisely diagnose whether there is an abnormality regarding the retainment control.

(3) If the deviation between the target amount of valve lift and the detected amount of valve lift is greater than the predetermined value Q when the retainment instruction has been outputted to the valve lift-varying mechanism and it is determined that no abnormality is present regarding the retainment control, then it is determined that there is an abnormality. Therefore, it is possible to precisely perform abnormality diagnosis regarding the operation control.

(4) Since the abnormality diagnosis regarding the valve timing-varying mechanism is performed after the intake valves 20 are forcibly controlled to the minimum valve lift, it is possible to precisely distinguish which one of the mechanisms has caused an abnormality after it is determined that there is an abnormality regarding either the valve lift-varying mechanism or the valve timing-varying mechanism.

(5) When it is diagnosed that one of the valve lift-varying mechanism and the valve timing-varying mechanism has an abnormality, the processing for removing a foreign object is performed with respect to the mechanism diagnosed as having an abnormality. Therefore, if the mechanism has a possibility of recovery to a normal state, the mechanism can be returned to the normal state.

(6) If it is determined that one of the valve lift-varying mechanism and the valve timing-varying mechanism has an abnormality, the fixation control is performed, that is, the valve lift-varying mechanism is fixed to the minimum valve lift side, and the valve timing-varying mechanism is fixed to the most retarded side, as mentioned above as examples. Therefore, even during the presence of an abnormality, the engine 11 can be safely driven.

(7) If it is determined that one of the valve lift-varying mechanism and the valve timing-varying mechanism has an abnormality, the fail-safe processing is suitably performed in a manner as mentioned above as (G)–(J) with respect to the mechanism diagnosed as having an abnormality. Therefore, during the presence of an abnormality, a safety-mode operation of the engine 11 can be realized.

The foregoing embodiment may be modified and embodied as follows.

The abnormality diagnosis execution conditions (c1) and (c2) employed in the foregoing embodiment are not immutable but may be suitably changed. Instead of the prohibition of diagnosis based on the hydraulic oil temperature, it is also possible to change the condition regarding the amount of change in the detected amount of valve lift at times when a low oil temperature and therefore an operation speed reduction are expected.

Furthermore, it is also possible to detect the hydraulic oil pressure and prohibit determination of an abnormality when the hydraulic pressure is not higher than a predetermined value. Still further, it is possible to change the determination condition depending on the hydraulic oil pressure.

In the foregoing embodiment, after it is determined that the valve lift-varying mechanism has an operation abnormality, the foreign object removing process is performed. If the mechanism does not recover to a normal state after the foreign object removing process, a suitable fail-safe process is performed. However, instead of this processing, or concurrently with this process, the monitoring of the amount of change in the detected amount of valve lift may be continued. When the amount of change becomes greater than a predetermined value, it may be determined that the valve lift-varying mechanism has recovered to the normal state.

In particular, if the retainment control abnormality is determined in step 130 in FIG. 7 and, during the diagnosis period, the operation instruction is outputted to the valve timing-varying mechanism, it is also possible to perform the abnormality diagnosis regarding the valve lift-varying mechanism again after the fixation control of the valve timing-varying mechanism.

Furthermore, in the foregoing embodiment, if it is diagnosed that there is an abnormality in one of the valve lift-varying mechanism and the valve timing-varying mechanism, the valve characteristic of the intake valves 20 is temporarily fixed to the minimum valve lift by the valve lift-varying mechanism, and then the abnormality diagnosis is performed again. However, the following operation is also possible. That is, if it is determined that there is an abnormality in the valve lift-varying mechanism or the valve timing-varying mechanism, the valve opening-closing timing of the intake valves 20 is fixed to the most retarded timing by the valve timing-varying mechanism, and then the abnormality diagnosis is performed again.

Still further, the control to the minimum valve lift or the control to the most retarded timing is not absolutely necessary. It is also possible to control and fix one of the mechanisms to an arbitrary state and then perform the abnormality diagnosis regarding the other mechanism.

Although in the foregoing embodiment, all the abnormality diagnoses exemplified above as (A), (B) and (C) are executed, any construction is possible as long as at least one of the abnormality diagnoses is performed.

Figure 11:
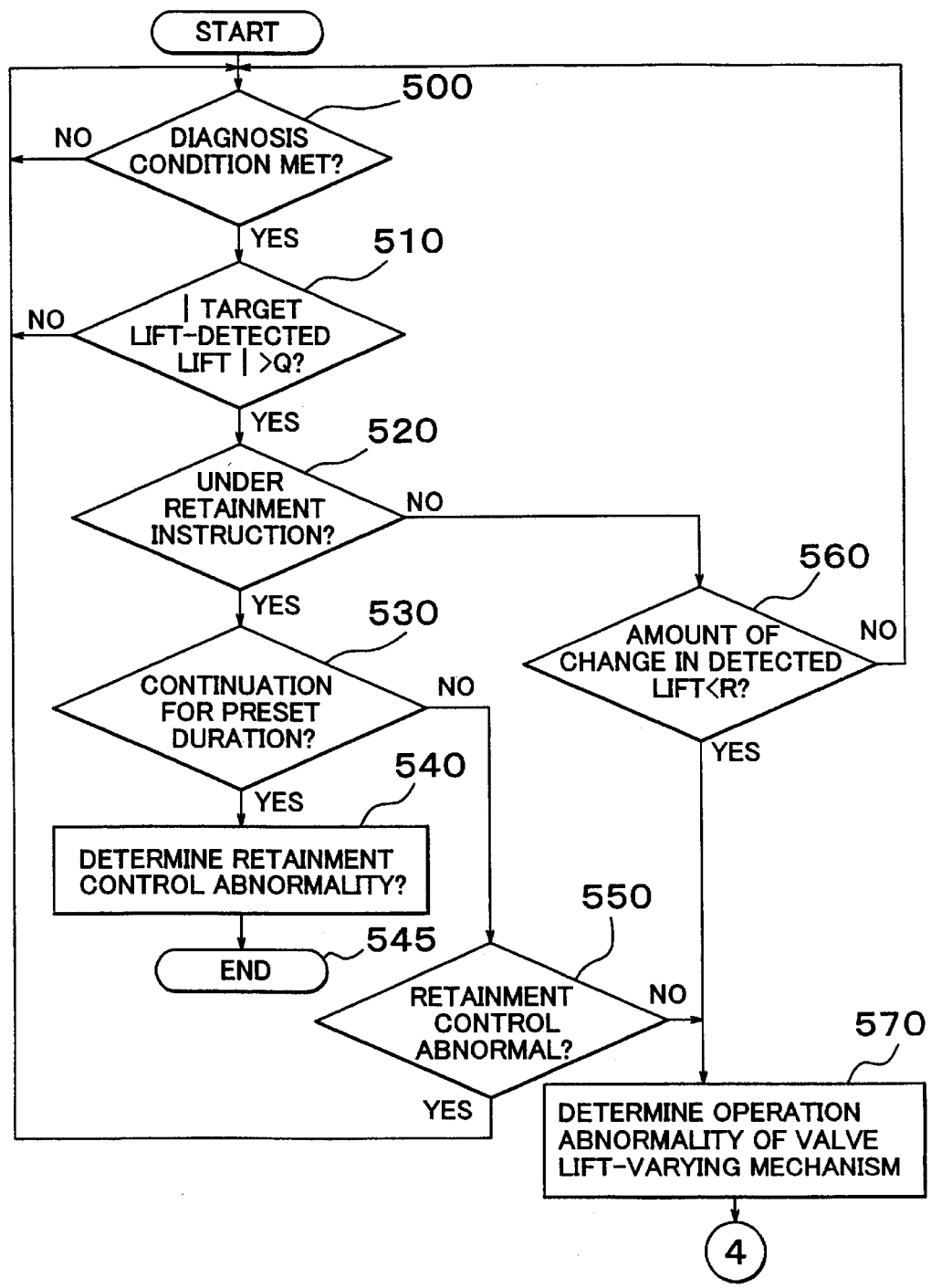
FIG. 11 is a flowchart illustrating a modification of the procedure of the valve characteristic control (abnormality diagnosis) of one exemplary embodiment of the invention.
Figure 12:
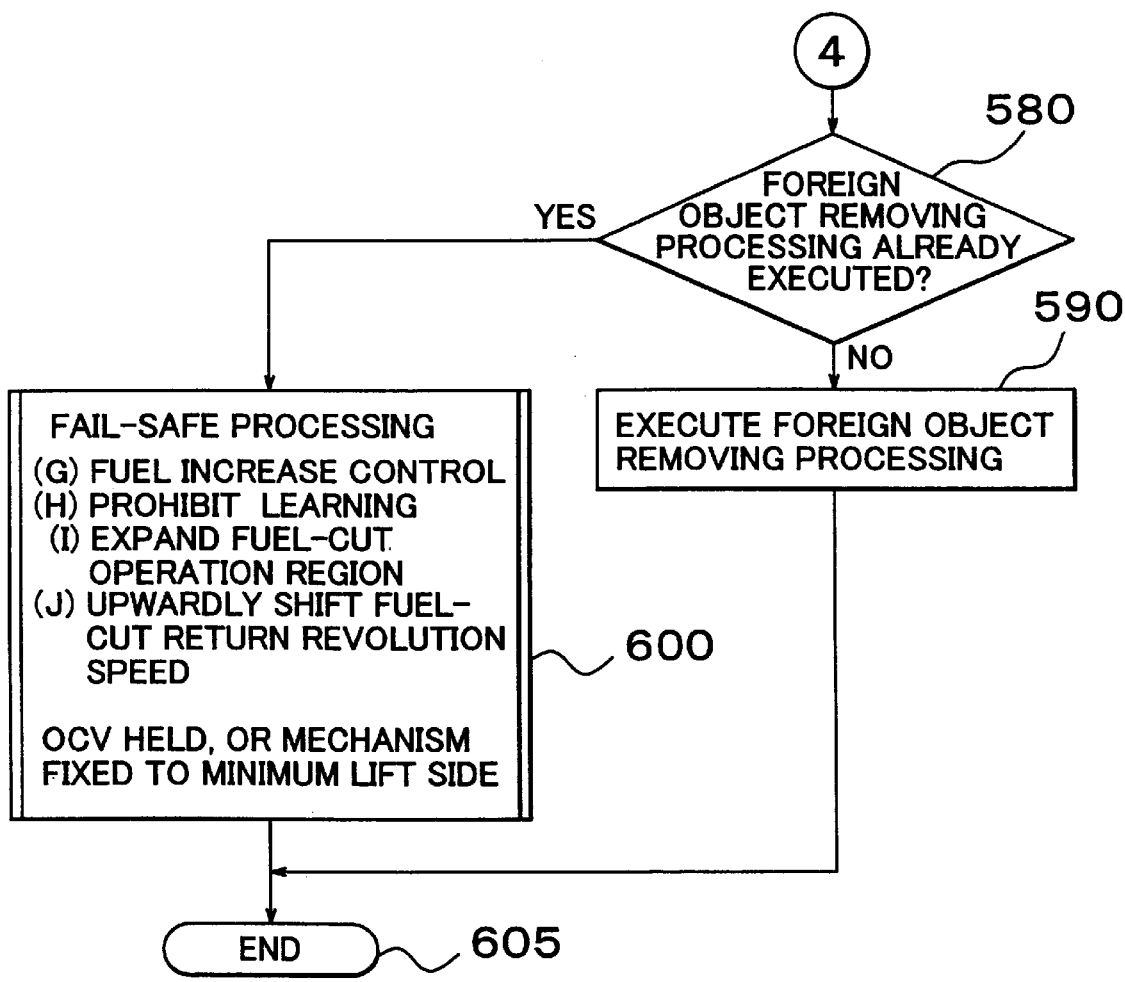
FIG. 12 is a flowchart illustrating the modification of the procedure of the valve characteristic control (abnormality diagnosis) of one exemplary embodiment of the invention.

Furthermore, the abnormality diagnosis regarding the lift-varying mechanism is not limited to the abnormality diagnoses exemplified above as (A), (B) and (C). For example, instead of performing the diagnosis (B), it is possible to perform the diagnosis (B') to determine a retainment control abnormality if a state where the retainment instruction is outputted continues for a predetermined duration although the deviation between the target amount of valve lift and the detected amount of valve lift is greater than a predetermined value. An example of the abnormality diagnosis incorporating the manner of diagnosis (B') is illustrated in FIGS. 11 and 12. In FIG. 11, a series of steps 510, 560, 570 corresponds to the diagnosis (A). Furthermore, a series of steps 510, 520, 530, 550, 570 corresponds to the diagnosis (C), and a series of steps 500–540 corresponds to the diagnosis (B'). The process in FIG. 12 following the abnormality diagnosis is substantially the same as the process of step 190 to step 210 in FIG. 8.

In FIG. 11, the process begins with step 500 where it is determined whether diagnosis condition(s) have been met. If not, the process waits until the condition(s) have been met. Once the conditions are met, the process continues to step 510, wherein it is determined whether the deviation between the target amount of valve lift and the detected amount of valve lift is greater than a predetermined valve Q. If in step 510, the deviation is at most the predetermined valve Q, then the process returns to step 500. Otherwise the process proceeds to step 520.

In step 520, it is determined whether a retainment control instruction has been outputted to the valve lift-varying mechanism. If it is determined that a retainment control instruction has been outputted, then the process proceeds to step 530.

In step 530, it is determined whether the amount of change in the detected amount of valve lift is less than a predetermined valve R has continued for a predetermined duration. If so, then it is determined that there is a retainment control abnormality in step 540 and the process ends at step 545. Otherwise the process proceeds to step 550. In step 550, it is determined whether the retainment control is abnormal. If so, the process proceeds back to step 500. Otherwise, the process proceeds to step 570, wherein it is determined that there is an operation abnormality of the valve lift-varying mechanism.

If in step 520 it is determined that the valve lift-varying mechanism is not in the retainment control state, the process proceeds to step 560. In step 560, it is determined whether the amount of change in the detected amount of valve lift is less than a predetermined valve R. If not, then the process proceeds back to step 500. Otherwise, the process proceeds to step 570, wherein it is determined that there is an operation abnormality of the valve lift-varying mechanism.

In the foregoing embodiment, the state where the deviation between the target amount of valve lift and the detected amount of valve lift is greater than the predetermined value Q and where the amount of change in the detected amount of valve lift is less than the predetermined value R is monitored for a predetermined duration, and after that, it is determined whether an abnormality is present. However, as for the deviation and the amount of change in the valve lift that are monitored, the history thereof may be recorded in a suitable memory or the like. Therefore, if the abnormality diagnosis regarding the valve lift-varying mechanism is urgently needed, for example, if an engine stall occurs due to an abnormality regarding the valve lift-varying mechanism, a precise processing can be performed based on the recorded history. This abnormality diagnosis regarding the valve lift-varying mechanism taking the engine stall into consideration is not limited to the aforementioned manner, but may also be performed as follows. As for the method for verifying the presence or absence of an abnormality regarding the valve lift-varying mechanism, it is possible to determine that there is a possibility of an abnormality if the amount of valve lift is great during an early period after the engine is started. In other words, if it is determined by some means that there is a possibility of an abnormality regarding the valve characteristic control in a case where an engine stall occurs, it is also possible to promptly determine that there is an abnormality.

Although the foregoing embodiment has a construction in which the amount of valve lift is detected via the cam angle sensor 126, and the reference-purposed detected portion 126a and the moving amount-purposed detected portion 126b, the means for detecting the amount of valve lift is not limited to the aforementioned construction, but is arbitrary. For example, it is possible to use a sensor for detecting vibrations of the engine 11 (e.g., a knock sensor) to grasp the amount of valve lift. In this case, for example, a vibration input value detected by the sensor and a reference value are compared by the ECU 130. If the vibration input value is greater than the reference value, it is determined that there is a possibility of an abnormality. When it is determined that there is a possibility of an abnormality, changes in the input vibration value may be monitored while the amount of valve lift is being changed (for example, toward the higher valve lift side), and an abnormality may be determined if there is no change in the input vibration value.

Furthermore, it is also possible to grasp the amount of valve lift based on an understanding that if there is an abnormality in the valve lift control, an abnormality also occurs in the amount of revolution fluctuation of the engine 11. In this case, for example, during an idle state where the amount of change in revolution is stable, a pre-recorded amount of revolution fluctuation during a normal state and a detected amount of revolution fluctuation may be compared.

Although in the foregoing embodiment, the intake-side camshaft 22 and the valve timing-varying actuator 24 are engaged with each other by the helical splines 61b, it is also possible to employ straight splines instead. In this case, too the abnormality diagnosis can be precisely performed by controlling and fixing one of the valve lift-varying mechanism and the valve timing-varying mechanism, and monitoring the manner of operation of the other mechanism.

Although in the foregoing embodiment, the valve lift-varying mechanism and the valve timing-varying mechanism are provided in the intake system, the mechanisms may be provided in the exhaust system or in both the intake system and the exhaust system.

Although the foregoing embodiment is described above in conjunction with how to perform the abnormality diagnosis regarding the valve lift varying mechanism and the subsequent processing with respect to the engine incorporating a combination of the valve lift-varying mechanism and the valve timing-varying mechanism, the abnormality diagnosis and the subsequent processing may be similarly applied to an engine equipped with the valve lift-varying mechanism but not with the valve timing-varying mechanism.

In the illustrated embodiment, the ECU 130 as a controller is implemented as a programmed general purpose computer. It will be appreciated by those skilled in the art that the controller can be implemented using single special purpose integrated circuits (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A valve characteristic control apparatus of internal combustion engine, comprising:
   a camshaft provided with a three-dimensional cam having a cam profile that continuously changes in a direction of an axis of the cam;
   a valve lift-varying mechanism that allows amount of valve lift of an engine valve to be varied in accordance with a displaced position of the camshaft in the direction of the axis of the cam;
   a sensor that detects an actual amount of valve lift and outputs a signal; and
   a controller that receives the signal from the sensor and diagnoses that there is an abnormality of the valve lift-varying mechanism, provided that a deviation between the actual amount of valve lift and a target amount of valve lift of the engine valve is greater than a predetermined value and that an amount of change in the actual amount of valve lift is less than a predetermined change value.

2. A valve characteristic control apparatus according to claim 1, wherein the controller causes the valve lift-varying mechanism to displace the camshaft to remove any foreign objects, if the controller determines that the valve lift-varying mechanism has an abnormality.

3. A valve characteristic control apparatus according to claim 1, wherein the controller causes the execution of a fail-safe operation if the controller determines that the valve lift-varying mechanism has an abnormality.

4. A valve characteristic control apparatus according to claim 3, wherein the fail-safe operation is at least one of increasing a fuel supplied to the engine, prohibiting a learning regarding an idle revolution speed control, prohibiting a learning regarding an air-fuel ratio feedback control, expanding a fuel-cut operation region, an upwardly shifting a fuel-cut return revolution speed.

5. A valve characteristic control apparatus of a internal combustion engine, comprising:
   a camshaft provided with a three-dimensional cam having a cam profile that continuously changes in a direction of an axis of the cam;
   a valve lift-varying mechanism that allows an amount of valve lift of an engine valve to be varied in accordance with a displaced position of the camshaft in the direction of the axis of the cam;
   at least one sensor that detects an actual amount of valve lift and outputs a signal; and
   a controller that receives the signal from the sensor and diagnoses that there is an abnormality of the valve lift-varying mechanism, provided that an amount of change in the actual amount of valve lift of the engine valve is greater than a predetermined value and the controller has been in a state of outputting an instruction to the valve lift-varying mechanism to retain the amount of valve lift for a predetermined duration.

6. A valve characteristic control apparatus according to claim 5, wherein the controller causes the valve lift-varying mechanism to displace the camshaft to remove any foreign objects, if the controller determines that the valve lift-varying mechanism has an abnormality.

7. A valve characteristic control apparatus according to claim 5, wherein the controller causes the execution of a fail-safe operation if the controller determines that the valve lift-varying mechanism has an abnormality.

8. A valve characteristic control apparatus according to claim 7, wherein the fail-safe operation is at least one of increasing a fuel supplied to the engine, prohibiting a learning regarding an idle revolution speed control, prohibiting a learning regarding an air-fuel ratio feedback control, expanding a fuel-cut operation region, and upwardly shifting a fuel-cut return revolution speed.

9. A valve characteristic control apparatus of internal combustion engine, comprising:
   a camshaft provided with a three-dimensional cam having a cam profile that continuously changes in a direction of an axis of the cam;
   a valve lift-varying mechanism that allows an amount of valve lift of an engine valve to be varied in accordance with a displaced position of the camshaft in the direction of the axis of the cam;
   a sensor that detects an actual amount of valve lift and outputs a signal; and
   a controller that receives the signal from the sensor and diagnoses that there is an abnormality of the valve lift-varying mechanism, provided that a deviation between the actual amount of valve lift and a target amount of valve lift of the engine valve is greater than a predetermined value and that there is no abnormality in a retainment control system while the controller is in a state of outputting an instruction to the valve lift-varying mechanism to retain an amount of valve lift.

10. A valve characteristic control apparatus according to claim 9, wherein the controller causes the valve lift-varying mechanism to displace the camshaft to remove any foreign objects, if the controller determines that the valve lift-varying mechanism has an abnormality.

11. A valve characteristic control apparatus according to claim 9, wherein the controller causes the execution of a fail-safe operation if the controller determines that the valve lift-varying mechanism has an abnormality.

12. A valve characteristic control apparatus according to claim 11, wherein the fail-safe operation is at least one of increasing a fuel supplied to the engine, prohibiting a learning regarding an idle revolution speed control prohibiting a learning regarding an air-fuel ratio feedback control, expanding a fuel-cut operation region, and upwardly shifting a fuel-cut return revolution speed.

13. A valve characteristic control apparatus of an internal combustion engine, comprising:
   a camshaft provided with a three-dimensional cam having a cam profile that continuously changes in a direction of an axis of the cam;
   a valve lift-varying mechanism that allows an amount of valve lift of an engine valve to be varied in accordance with a displaced position of the camshaft in the direction of the axis of the cam;
   a sensor that detects an actual amount of valve lift and outputs a signal; and
   a controller that receives the signal from the sensor and diagnoses that there is an abnormality of the valve lift-varying mechanism, provided that a deviation between the actual amount of valve lift and a target amount of valve lift of the engine valve is greater than a predetermined value and that at least one of the following conditions is met:
      (a) an amount of change in the actual amount of valve lift is less than a predetermined change value;
      (b) the controller has been in a state of outputting an instruction to the valve lift-varying mechanism to maintain the amount of valve lift for a predetermined duration; and
      (c) there is no abnormality in a retainment control system while the controller is in a state of outputting an instruction to the valve lift-varying mechanism to maintain the amount of valve lift.

14. A valve characteristic control apparatus according to claim 13, wherein the controller causes the valve lift-varying mechanism to displace the camshaft to remove any foreign objects, if the controller determines that the valve lift-varying mechanism has an abnormality.

15. A valve characteristic control apparatus according to claim 13, wherein the controller causes the execution of a fail-safe operation if the controller determines that the valve lift-varying mechanism has an abnormality.

16. A valve characteristic control apparatus according to claim 15, wherein the fail-safe operation is at least one of increasing a fuel supplied to the engine, prohibiting a learning regarding an idle revolution speed control prohibiting a learning regarding an air-fuel ratio feedback control, expanding a fuel-cut operation region, and upwardly shifting a fuel-cut return revolution speed.

17. A valve characteristic control apparatus of internal combustion engine, comprising:
   a camshaft provided with a three-dimensional cam having a cam profile that continuously changes in a direction of an axis of the cam;
   a valve lift-varying mechanism that allows an amount of valve lift of an engine valve to be varied in accordance with a displaced position of the camshaft in the direction of the axis of the cam;
   a valve timing-varying mechanism that allows a valve timing of the engine valve to be varied based on a change in a relative rotation phase between the camshaft and an engine output shaft;
   a first sensor that detects an actual amount of valve lift and outputs a signal;
   a set of rotation phase sensors that detect an actual relative rotation phase between the camshaft and the engine output shaft and output a relative rotation phase signal; and
   a controller that receives the signal from the first sensor and the relative rotation phase signal from the set of rotation phase sensors, and the controller diagnoses whether there is an abnormality based on the actual amount of valve lift and a target amount of valve lift of the engine valve, and the actual relative rotation phase and a target relative rotation phase between the camshaft and the engine output shaft,
   wherein the controller causes one of the valve lift-varying mechanism to be in a minimum engine valve lift state and the valve timing-varying mechanism to be in a most retarded valve timing state, if the controller determines that here is an abnormality,
   wherein after the controller causes one of the valve lift-varying mechanism to be in a minimum engine valve lift state and the valve tinning-varying mechanism to be in a most retarded valve timing state, the controller diagnoses whether the abnormality still exists and if so, the controller distinguishes which one of the valve lift-varying mechanism and the valve timing-varying mechanism has the abnormality.

18. A valve characteristic control apparatus according to claim 17, wherein the controller causes the valve lift-varying mechanism to displace the camshaft to remove any foreign objects, if the controller determines that the valve lift-varying mechanism has an abnormality.

19. A valve characteristic control apparatus according to claim 17, wherein the controller causes the execution of a fail-safe operation if the controller determines that the valve lift-varying mechanism has an abnormality.

20. A valve characteristic control apparatus according to claim 19, wherein the fail-safe operation is at least one of increasing a fuel supplied to the engine, prohibiting a learning regarding an idle revolution speed control prohibiting a learning regarding an air-fuel ratio feedback control, expanding a fuel-cut operation region, and upwardly shifting a fuel-cut return revolution speed.

* * * * *